(12) United States Patent
Smith et al.

(10) Patent No.: US 9,317,854 B2
(45) Date of Patent: Apr. 19, 2016

(54) AUTOMATIC AUDIO LEVEL ADJUSTMENT FOR VIDEO VENDING MACHINES

(71) Applicant: Cubic Corporation, San Diego, CA (US)

(72) Inventors: Gavin R. Smith, Crawley (GB); Steffen Reymann, Reigate (DE); Jason Kenward, Guildford (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/695,382

(22) Filed: Apr. 24, 2015

(65) Prior Publication Data

US 2015/0288931 A1  Oct. 8, 2015

Related U.S. Application Data

(63) Continuation of application No. 14/678,296, filed on Apr. 3, 2015.

(60) Provisional application No. 61/974,919, filed on Apr. 3, 2014, provisional application No. 61/977,515, filed (Continued)

(51) Int. Cl.
*H04N 7/14* (2006.01)
*G06Q 30/00* (2012.01)
(Continued)

(52) U.S. Cl.
CPC ............ *G06Q 30/016* (2013.01); *G06F 3/0416* (2013.01); *G06K 9/00771* (2013.01); *G06Q 10/02* (2013.01); *G06Q 20/18* (2013.01); *G06Q 30/0641* (2013.01); *G06Q 30/0643* (2013.01); *G06T 11/60* (2013.01); *G07F 9/006* (2013.01); *G07F 9/023* (2013.01); *G07F 11/002* (2013.01);
(Continued)

(58) Field of Classification Search
CPC ..... G07F 9/006; G07F 17/0014; G07F 9/023; G07F 11/002; G06K 9/00771; G06Q 20/18; G06Q 30/016; G06Q 30/0641; G06Q 30/0643; G06Q 10/02; G06F 3/0416; G06T 11/60
USPC ................... 348/14.01–14.16; 370/259–271, 370/351–357; 709/201–207, 217–248
See application file for complete search history.

(56) References Cited

U.S. PATENT DOCUMENTS

| | | |
|---|---|---|
| 5,408,417 A | 4/1995 | Wilder |
| 5,769,269 A | 6/1998 | Peters |

(Continued)

*Primary Examiner* — Hemant Patel
(74) *Attorney, Agent, or Firm* — Kilpatrick Townsend & Stockton LLP

(57) ABSTRACT

A method for retrofitting a vending machine with a video communications device includes securing a video communications device with a mounting feature of the video communications device removably coupled with a mounting location on a vending machine. The video communications device includes a video communications module for real-time interactions with a ticket office. The video communications module includes a display, a camera, a speaker, and a microphone. The video communications device includes a video communication device communications interface. The method includes electronically coupling the video communications device with a power supply of the vending machine and communicatively coupling the video communications device with the vending machine such that functions of the vending machine are controllable using the video communications device. The method includes communicatively coupling the video communications device with the ticket office for real-time video communications with the ticket office.

17 Claims, 18 Drawing Sheets

Related U.S. Application Data on Apr. 9, 2014, provisional application No. 61/977,521, filed on Apr. 9, 2014, provisional application No. 61/977,525, filed on Apr. 9, 2014, provisional application No. 61/978,037, filed on Apr. 10, 2014.

(51) Int. Cl.

| | | |
|---|---|---|
| *G06Q 20/18* | (2012.01) | |
| *G07F 9/02* | (2006.01) | |
| *G07F 11/00* | (2006.01) | |
| *H04N 7/18* | (2006.01) | |
| *G06Q 30/06* | (2012.01) | |
| *G06F 3/041* | (2006.01) | |
| *G06T 11/60* | (2006.01) | |
| *G09G 5/00* | (2006.01) | |
| *G06K 9/00* | (2006.01) | |
| *G07F 9/00* | (2006.01) | |
| *G07F 17/00* | (2006.01) | |
| *G06Q 10/02* | (2012.01) | |

(52) U.S. Cl.
CPC ............ *G07F 17/0014* (2013.01); *G09G 5/003* (2013.01); *H04N 7/141* (2013.01); *H04N 7/142* (2013.01); *H04N 7/18* (2013.01); *H04N 7/183* (2013.01)

(56) References Cited

U.S. PATENT DOCUMENTS

| | | | |
|---|---|---|---|
| 5,774,663 A | 6/1998 | Randle | |
| 6,233,462 B1 * | 5/2001 | Kanai | H04M 9/08 379/378 |
| 6,308,887 B1 | 10/2001 | Korman | |
| 6,721,400 B2 | 4/2004 | Schelberg, Jr. | |
| 6,801,836 B2 * | 10/2004 | Schanin | H05B 37/0218 307/39 |
| 6,945,457 B1 | 9/2005 | Barcelou | |
| 6,968,321 B1 | 11/2005 | Yu | |
| 7,027,808 B2 | 4/2006 | Wesby | |
| 7,062,465 B1 | 6/2006 | Shafiee et al. | |
| 7,100,191 B1 | 8/2006 | Goldberg et al. | |
| 7,227,526 B2 * | 6/2007 | Hildreth | G06T 19/006 345/156 |
| 7,392,066 B2 * | 6/2008 | Haparnas | H04M 19/044 379/373.01 |
| 7,706,521 B2 | 4/2010 | Gavagni | |
| 8,259,153 B1 * | 9/2012 | Campbell, III | G06Q 30/02 348/14.01 |
| 8,739,293 B2 | 5/2014 | Walker | |
| 8,745,541 B2 * | 6/2014 | Wilson | G06F 3/017 345/156 |
| 8,774,963 B2 | 7/2014 | Signorelli | |
| 2003/0158891 A1 | 8/2003 | Lei | |
| 2006/0226596 A1 | 10/2006 | Walker et al. | |
| 2006/0243796 A1 | 11/2006 | Macklin et al. | |
| 2007/0016559 A1 | 1/2007 | Kraft | |
| 2007/0083287 A1 | 4/2007 | Defosse | |
| 2008/0255901 A1 | 10/2008 | Carroll et al. | |
| 2009/0222318 A1 | 9/2009 | Anelevitz | |
| 2009/0276272 A1 | 11/2009 | Hughes | |
| 2010/0208631 A1 | 8/2010 | Zhang et al. | |
| 2011/0054677 A1 | 3/2011 | Liddell | |
| 2011/0173574 A1 * | 7/2011 | Clavin | G06F 3/017 715/863 |
| 2012/0265809 A1 | 10/2012 | Hanson | |
| 2013/0215275 A1 * | 8/2013 | Berini | G06F 21/32 348/150 |
| 2013/0278706 A1 * | 10/2013 | Connelly | H04N 21/4316 348/14.01 |
| 2013/0298076 A1 | 11/2013 | Rice et al. | |
| 2014/0067998 A1 * | 3/2014 | Garcia | H04L 65/4084 709/217 |
| 2014/0137006 A1 | 5/2014 | Goodwin et al. | |
| 2014/0173474 A1 | 6/2014 | Klemenz et al. | |
| 2015/0066761 A1 * | 3/2015 | Chang | G06Q 20/1085 705/43 |
| 2015/0134468 A1 | 5/2015 | Dixon et al. | |

* cited by examiner

FIG. 3
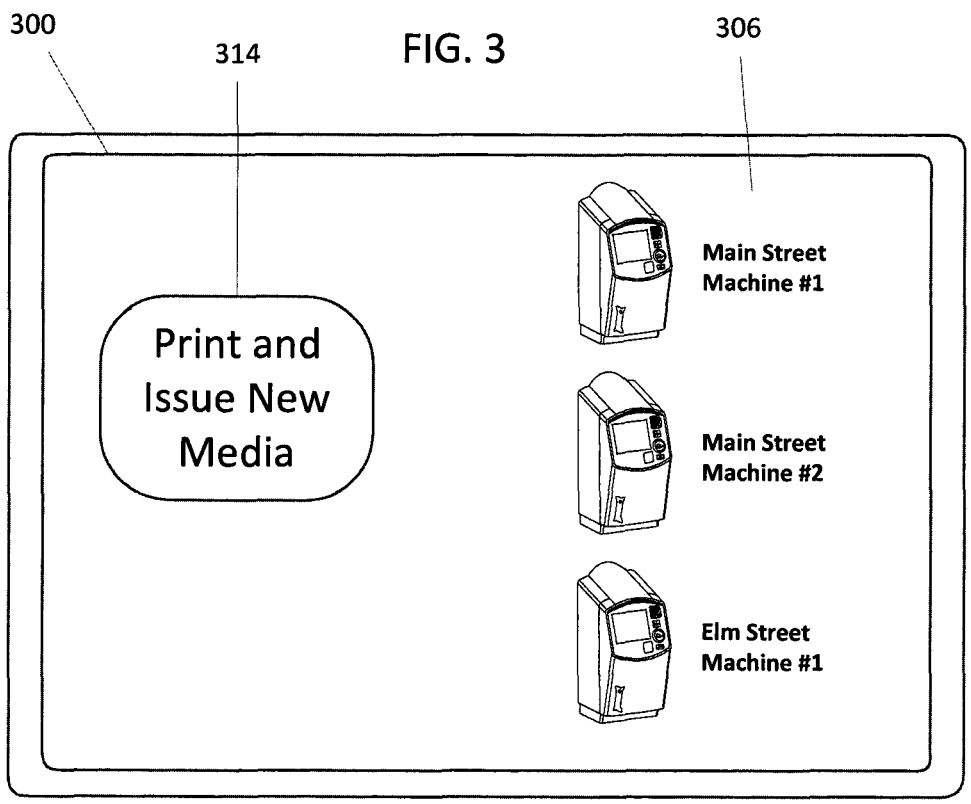
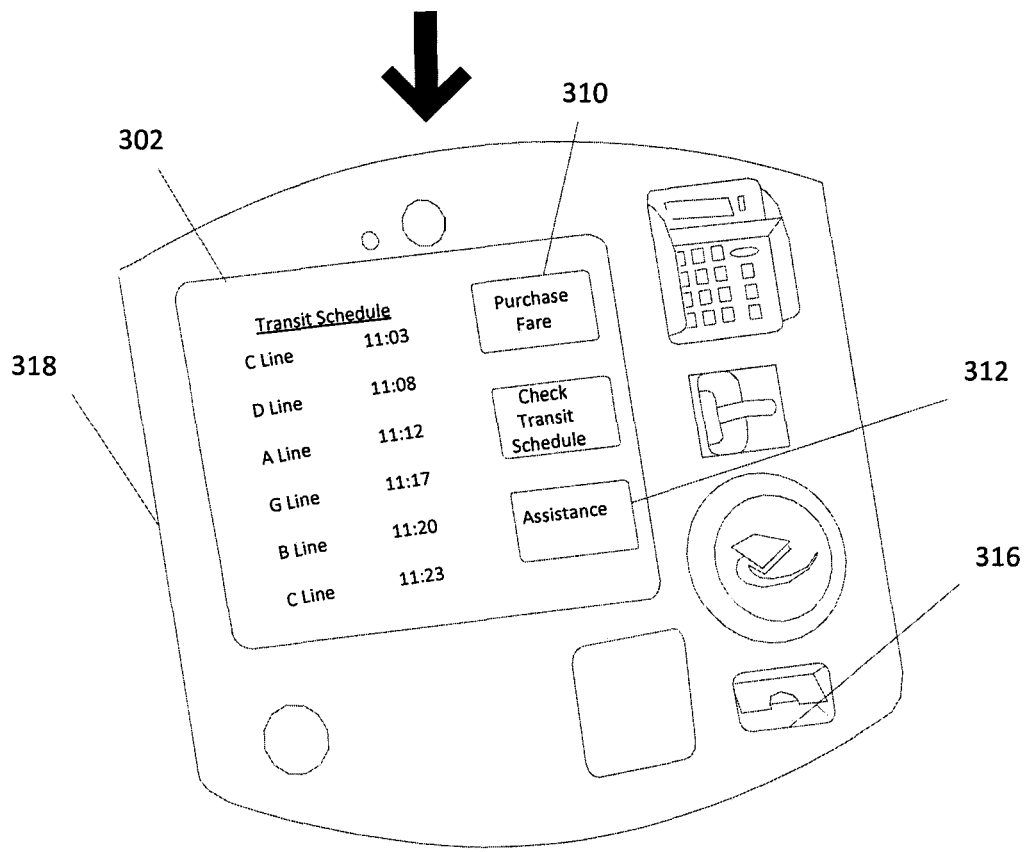

FIG. 7
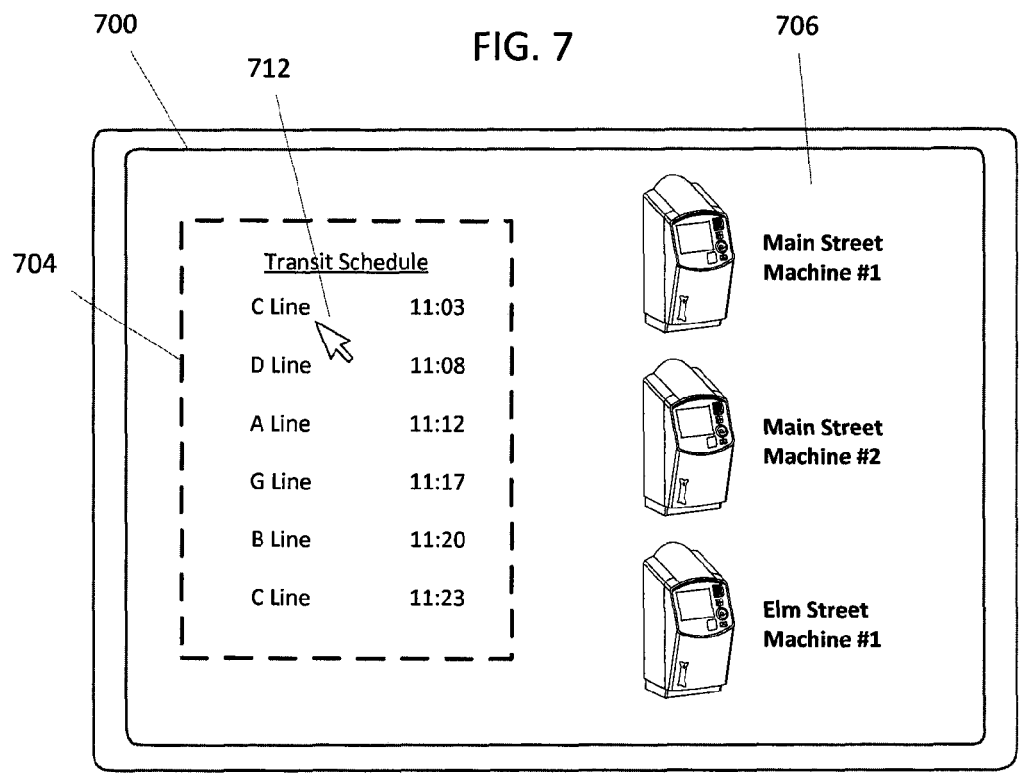
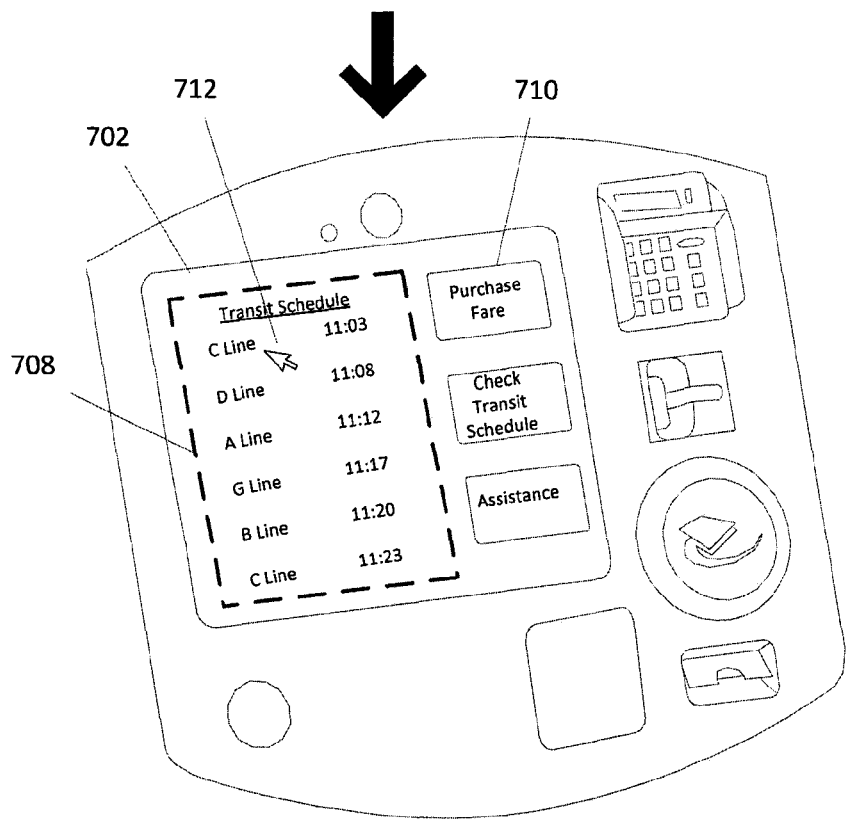

US 9,317,854 B2

AUTOMATIC AUDIO LEVEL ADJUSTMENT FOR VIDEO VENDING MACHINES

CROSS-REFERENCES TO RELATED APPLICATIONS

The present application is also related to U.S. patent application Ser. No. 14/695,404 entitled "REMOTE EXPERT MODE INVOCATION"; U.S. patent application Ser. No. 14/695,339 entitled "REMOTE SCREEN AND TOUCH SHARING"; and U.S. patent application Ser. No. 14/695,363 entitled "CONTEXTUAL USER INTERFACE ELEMENTS FROM EXTERNAL TRIGGERS", all of which are filed concurrently herewith and incorporated herein by reference for all purposes.

This application claims priority to U.S. Provisional Patent Application No. 61/974,919 filed Apr. 3, 2014, entitled "MICRO VIDEO ASSISTANT," U.S. Provisional Patent Application No. 61/977,515 filed Apr. 9, 2014, entitled "REMOTE EXPERT MODE INVOCATION," U.S. Provisional Patent Application No. 61/977,521 filed Apr. 9, 2014, entitled "REMOTE SCREEN AND TOUCH SHARING," U.S. Provisional Patent Application No. 61/977,525 filed Apr. 9, 2014, entitled "CONTEXTUAL USER INTERFACE ELEMENTS FROM EXTERNAL TRIGGERS," and U.S. Provisional Patent Application No. 61/978,037 filed Apr. 10, 2014, entitled "AUTOMATIC AUDIO LEVEL ADJUSTMENT FOR VIDEO VENDING MACHINES," the entire disclosure of which are hereby incorporated by reference, for all purposes, as if fully set forth herein.

BACKGROUND OF THE INVENTION

Vending machines are commonly used in transit systems. However, with the vast array of fare types, transit media, and payment types, the vending machines have grown increasingly complex. This results in difficult to use, time intensive machines that may be cumbersome for even everyday transit users to quickly operate. To help alleviate these issues, video vending machines have been introduced that allow users to communicate via video with a transit system agent. However, there are still issues with users being able to follow verbal directions and to locate necessary components of the vending machines. As such, many transit systems still maintain local employees to assist users with vending machines. This can be a large expense for a transit system.

BRIEF SUMMARY OF THE INVENTION

Embodiments provide systems and methods for creating more user friendly vending machines that are capable of providing a full array of products and services. Embodiments include systems for remote expert control of the vending machine components, as well as the ability to share content from a remote computer of a ticketing office to a vending machine to further aid a user in completing a transaction. Embodiments further provide systems for providing indications to help a user operate vending machine peripherals and for adjusting parameters of the vending machine to be at more satisfactory levels for the user. Additional embodiments provide systems and methods for retrofitting existing vending machines with video communication devices configured to enable all of the above functionality for existing systems, without the need for replacing the vending machine.

In one aspect, a method for retrofitting an existing vending machine with a video communications device is provided. The method may include securing a video communications device such that a mounting feature of the video communications device is removably coupled with a mounting location on a housing of a vending machine. The video communications device may include a video communications module configured to enable real-time audio/video interactions with a ticket office of the transit system. The video communications module may include a display, a camera directed in front of the vending machine such that an image of a user of the vending machine is capturable by the camera, a speaker, and a microphone. The video communications device may also include a video communication device communications interface. The method may also include electronically coupling the video communications device with a power supply of the vending machine such that the video communications device receives operating power from the power supply and communicatively coupling the video communications device with a communications interface of the vending machine such that functions of the vending machine are controllable using the video communications device. The method may further include communicatively coupling the video communications device with the ticket office using a communications interface of the video communications device to enable real-time video communications with the ticket office.

In another aspect, a method for retrofitting an existing vending machine with a video communications device may include securing a video communications device such that a mounting feature of the video communications device is removably coupled with a mounting location on a housing of a vending machine. The video communications device may include a video communications module configured to enable real-time audio/video interactions with a ticket office of the transit system and a video communication device communications interface. The method may also include electronically coupling the video communications device with a power supply of the vending machine such that the video communications device receives operating power from the power supply and communicatively coupling the video communications device with a communications interface of the vending machine such that functions of the vending machine are controllable using the video communications device. The method may further include communicatively coupling the video communications device with the ticket office to enable real-time video communications with the ticket office.

In another aspect, a system for providing video communication with a central ticket office of a transit system using existing transit fare vending machines is provided. The system may include a vending machine having a housing having a mounting location, a power supply, and a vending machine communications interface in communication with a ticket office of the transit system. The system may also include a video communication device having a video communications module configured to enable real-time audio/video interactions with a ticket office of the transit system, a video communication device communications interface, and a mounting feature. The mounting feature may be removably securable to the mounting location such that the video communications device is accessible to a user of the vending machine. The video communication device may be electrically coupled with the power supply such that the video communication device receives operating power from the power supply. The video communication enclosure may be communicatively coupled with the transit system.

In another aspect, a method for remotely controlling a function of a transit fare vending machine is provided. The method may include receiving, at a transit fare vending machine, an input to initiate audio/visual communication with a ticket office of a transit system. The input may be provided by a user of the transit fare vending machine. Audio/visual communication may be established between the transit fare vending machine and the ticket office. A request to enable control of the transit fare vending machine by a remote device of the ticket office may be received. The method also includes authenticating a user of the remote device. Authentication may include receiving identity credentials associated with a user of the remote device. Control of the transit fare vending machine may be provided to the remote device upon authentication of the user of the remote device. An input device of the transit fare vending machine may be disabled such that the transit fare vending machine is controllable only by the remote device. One or more functions associated with a transit fare transaction may be executed based on instructions received from the remote device.

In another aspect, a non-transitory computer-readable medium having instructions embedded thereon for remotely controlling a function of a transit fare vending machine is provided. The instructions may include computer code for causing a computing device to receive, at a transit fare vending machine, an input to initiate audio/visual communication with a ticket office of a transit system. The input may be provided by a user of the transit fare vending machine. The instructions may also include computer code for causing a computing device to establish audio/visual communication between the transit fare vending machine and the ticket office and to receive an request to enable control of the transit fare vending machine by a remote device of the ticket office. The instructions may further include computer code for causing a computing device to authenticate a user of the remote device. Authentication may include receiving identity credentials associated with a user of the remote device. The instructions may include computer code for causing a computing device to provide control of the transit fare vending machine to the remote device upon authentication of the user of the remote device and to disable an input device of the transit fare vending machine such that the transit fare vending machine is controllable only by the remote device. The instructions may also include computer code for causing a computing device to execute one or more functions associated with a transit fare transaction based on instructions received from the remote device.

In another aspect, a transit fare vending machine is provided. The vending machine may include a communications interface configured to send and receive data, a memory, and a processor. The processor may be configured to receive an input to initiate audio/visual communication with a ticket office of a transit system. The input may be provided by a user of the transit fare vending machine. The processor may also be configured to establish audio/visual communication between the transit fare vending machine and the ticket office and to receive an request to enable control of the transit fare vending machine by a remote device of the ticket office. The processor may be further configured to authenticate a user of the remote device. Authentication may include receiving identity credentials associated with a user of the remote device. The processor may be configured to provide control of the transit fare vending machine to the remote device upon authentication of the user of the remote device and to disable an input device of the transit fare vending machine such that the transit fare vending machine is controllable only by the remote device. The processor may be configured to execute one or more functions associated with a transit fare transaction based on instructions received from the remote device.

In another aspect, a method for sharing a screen from a remote device to a transit fare vending machine is provided. The method may include receiving, at a transit fare vending machine, an input to initiate communication with a remote device of a ticket office of a transit system. The input may be provided by a user of the transit fare vending machine. The method may also include establishing the communication between the transit fare vending machine and the remote device of the ticket office and receiving a request to share an image of a screen of the remote device of a ticket office of a transit system. The method may further include receiving an image comprising a selection of at least a portion of the screen of the remote device and overlaying the image of the selected portion of the screen of the remote device on at least a portion of a display of the transit fare vending machine such that a user interface of the transit fare vending machine remains below the overlaid image. The method may include monitoring the selected portion of the screen of the remote device to detect real-time changes of information present in the selected portion of the screen of the remote device and updating the overlaid image of the selected portion of the screen with any detected real-time changes such that the display of the transit fare vending machine presents a real-time representation of information from the selected portion of the screen of the remote device.

In another aspect, a non-transitory computer-readable medium having instructions embedded thereon for sharing a screen from a remote device to a transit fare vending machine is provided. The instructions may include computer code for causing a computing device to receive, at a transit fare vending machine, an input to initiate communication with a remote device of a ticket office of a transit system. The input may be provided by a user of the transit fare vending machine. The instructions may also include computer code for causing the computing device to establish the communication between the transit fare vending machine and the remote device of the ticket office and to receive a request to share an image of a screen of the remote device of a ticket office of a transit system. The instructions may further include computer code for causing the computing device to receive an image comprising a selection of at least a portion of the screen of the remote device and to overlay the image of the selected portion of the screen of the remote device on at least a portion of a display of the transit fare vending machine such that a user interface of the transit fare vending machine remains below the overlaid image. The instructions may include computer code for causing the computing device to monitor the selected portion of the screen of the remote device to detect real-time changes of information present in the selected portion of the screen of the remote device and to update the overlaid image of the selected portion of the screen with any detected real-time changes such that the display of the transit fare vending machine presents a real-time representation of information from the selected portion of the screen of the remote device.

In another aspect, a transit fare vending machine is provided. The vending machine may include a communications interface configured to send and receive data, a memory, and a processor. The processor may be configured to receive an input to initiate communication with a remote device of a ticket office of a transit system. The input may be provided by a user of the transit fare vending machine. The processor may be further configured to establish the communication between the transit fare vending machine and the remote device of the ticket office and to receive a request to share an image of a screen of the remote device of a ticket office of a transit system. The processor may also be configured to receive an image comprising a selection of at least a portion of the screen of the remote device and to overlay the image of the selected portion of the screen of the remote device on at least a portion of a display of the transit fare vending machine such that a user interface of the transit fare vending machine remains below the overlaid image. The processor may be configured to monitor the selected portion of the screen of the remote device to detect real-time changes of information present in the selected portion of the screen of the remote device and to update the overlaid image of the selected portion of the screen with any detected real-time changes such that the display of the transit fare vending machine presents a real-time representation of information from the selected portion of the screen of the remote device.

In another aspect, a method for providing contextual interface elements from external triggers of a transit fare vending machine is provided. The method may include receiving, at a transit fare vending machine, an input to begin a transaction associated with a transit fare media. The method may also include detecting a function of the transit fare vending machine. The function may utilize at least one of a plurality of hardware peripherals of the transit fare vending machine. The method may additionally include determining the at least one of the plurality of hardware peripherals utilized by the function and retrieving one or more rules associated with the function and the at least one of the plurality of hardware peripherals. The method may also include overlaying an indication on at least a portion of a display of the transit fare vending machine in accordance with the one or more rules. The indication may include at least one contexture element depicting a use of the at least one of the plurality of hardware peripherals in association with a completion of the function. The method may include illuminating one or more light elements proximate to the at least one of the plurality of hardware peripherals to indicate the location or operation of the at least one of the plurality of hardware peripherals in association with the completion of the function in accordance with the one or more rules.

In another aspect, a non-transitory computer-readable medium having instructions embedded thereon for sharing a screen from a remote device to a transit fare vending machine is provided. The instructions may include computer code for causing a computing device to receive, at a transit fare vending machine, an input to begin a transaction associated with a transit fare media and to detect a function of the transit fare vending machine, the function utilizing at least one of a plurality of hardware peripherals of the transit fare vending machine. The instructions may include computer code for causing a computing device to determine the at least one of the plurality of hardware peripherals utilized by the function and to retrieve one or more rules associated with the function and the at least one of the plurality of hardware peripherals. The instructions further may include computer code for causing a computing device to overlay an indication on at least a portion of a display of the transit fare vending machine in accordance with the one or more rules. The indication may include least one contexture element depicting a use of the at least one of the plurality of hardware peripherals in association with a completion of the function. The instructions may include computer code for causing a computing device to illuminate one or more light elements proximate to the at least one of the plurality of hardware peripherals to indicate the location or operation of the at least one of the plurality of hardware peripherals in association with the completion of the function in accordance with the one or more rules.

In another aspect, a transit fare vending machine is provided. The vending machine may include a communications interface configured to send and receive data, a memory, and a processor. The processor may be configured to receive an input to begin a transaction associated with a transit fare media and to detect a function of the transit fare vending machine. The function may utilize at least one of a plurality of hardware peripherals of the transit fare vending machine. The processor may also be configured to determine the at least one of the plurality of hardware peripherals utilized by the function and to retrieve one or more rules associated with the function and the at least one of the plurality of hardware peripherals. The processor may additionally be configured to overlay an indication on at least a portion of a display of the transit fare vending machine in accordance with the one or more rules. The indication may include at least one contexture element depicting a use of the at least one of the plurality of hardware peripherals in association with a completion of the function. The processor may be configured to illuminate one or more light elements proximate to the at least one of the plurality of hardware peripherals to indicate the location or operation of the at least one of the plurality of hardware peripherals in association with the completion of the function in accordance with the one or more rules.

In another aspect, a method of automatically adjusting a parameter of a transit fare vending machine based on a response is provided. The method may include receiving, at a transit fare vending machine, an input to initiate audio/visual communication with a remote device of a ticket office of a transit system. The input may be provided by a user of the transit fare vending machine. The method may also include establishing the audio/visual communication between the transit fare vending machine and the remote device of the ticket office and detecting, using sensors of the transit fare vending machine, a response from the user of the transit fare vending machine. The response may include one or more of a body position or a body action of the user associated with a parameter of the transit fare vending machine being outside of a desired range. The method may further include matching the response with at least one remedy of a database of remedies. Each remedy may include an adjustment to a parameter of the transit fare vending machine. The method may include adjusting a parameter of the transit fare vending machine related to the audio/visual communication based on the matched remedy such that the parameter may be tuned to the desired range and monitoring the response to the adjusted parameter to determine whether the adjustment successfully tuned the parameter to the desired range.

In another aspect, a non-transitory computer-readable medium having instructions embedded thereon for automatically adjusting a parameter of a transit fare vending machine based on a response is provided. The instructions may include computer code for causing a computing device to receive, at a transit fare vending machine, an input to initiate audio/visual communication with a remote device of a ticket office of a transit system. The input may be provided by a user of the transit fare vending machine. The instructions may include computer code for causing a computing device to establish the audio/visual communication between the transit fare vending machine and the remote device of the ticket office and to detect, using sensors of the transit fare vending machine, a response from the user of the transit fare vending machine. The response may include one or more of a body position or a body action of the user associated with a parameter of the transit fare vending machine being outside of a desired range. The instructions may also include computer code for causing a computing device to match the response with at least one remedy of a database of remedies. Each remedy may include an adjustment to a parameter of the transit fare vending machine. The instructions may further include computer code for causing a computing device to adjust a parameter of the transit fare vending machine related to the audio/visual communication based on the matched remedy such that the parameter may be tuned to the desired range and to monitor the response to the adjusted parameter to determine whether the adjustment successfully tuned the parameter to the desired range.

In another aspect, a transit fare vending machine is provided. The vending machine may include a communications interface configured to send and receive data, a sensor interface, a memory, and a processor. The processor may be configured to receive an input to initiate audio/visual communication with a remote device of a ticket office of a transit system. The input may be provided by a user of the transit fare vending machine. The processor may also be configured to establish the audio/visual communication between the transit fare vending machine and the remote device of the ticket office and to detect, using the sensor interface, a response from the user of the transit fare vending machine. The response may include one or more of a body position or a body action of the user associated with a parameter of the transit fare vending machine being outside of a desired range. The processor may be further configured to match the response with at least one remedy of a database of remedies. Each remedy may include an adjustment to a parameter of the transit fare vending machine. The processor may be configured to adjust a parameter of the transit fare vending machine related to the audio/visual communication based on the matched remedy such that the parameter may be tuned to the desired range and to monitor the response to the adjusted parameter to determine whether the adjustment successfully tuned the parameter to the desired range.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 depicts a remote expert mode of a vending machine according to embodiments.

FIG. 7 depicts screen sharing using a vending machine according to embodiments.

DETAILED DESCRIPTION OF THE INVENTION

Embodiments provide vending machines, systems, and methods for creating user friendly, yet powerful vending machines. While discussed largely within the setting of a transit system, it will be appreciated that the disclosure herein may be applied to any type of vending machine and/or other machinery where a user will benefit from expert interaction and/or automatic feedback from the machinery. By creating more user friendly vending machines, time is saved, making customers more likely to utilize the machines, thus generating increased sales.

Figure 1:
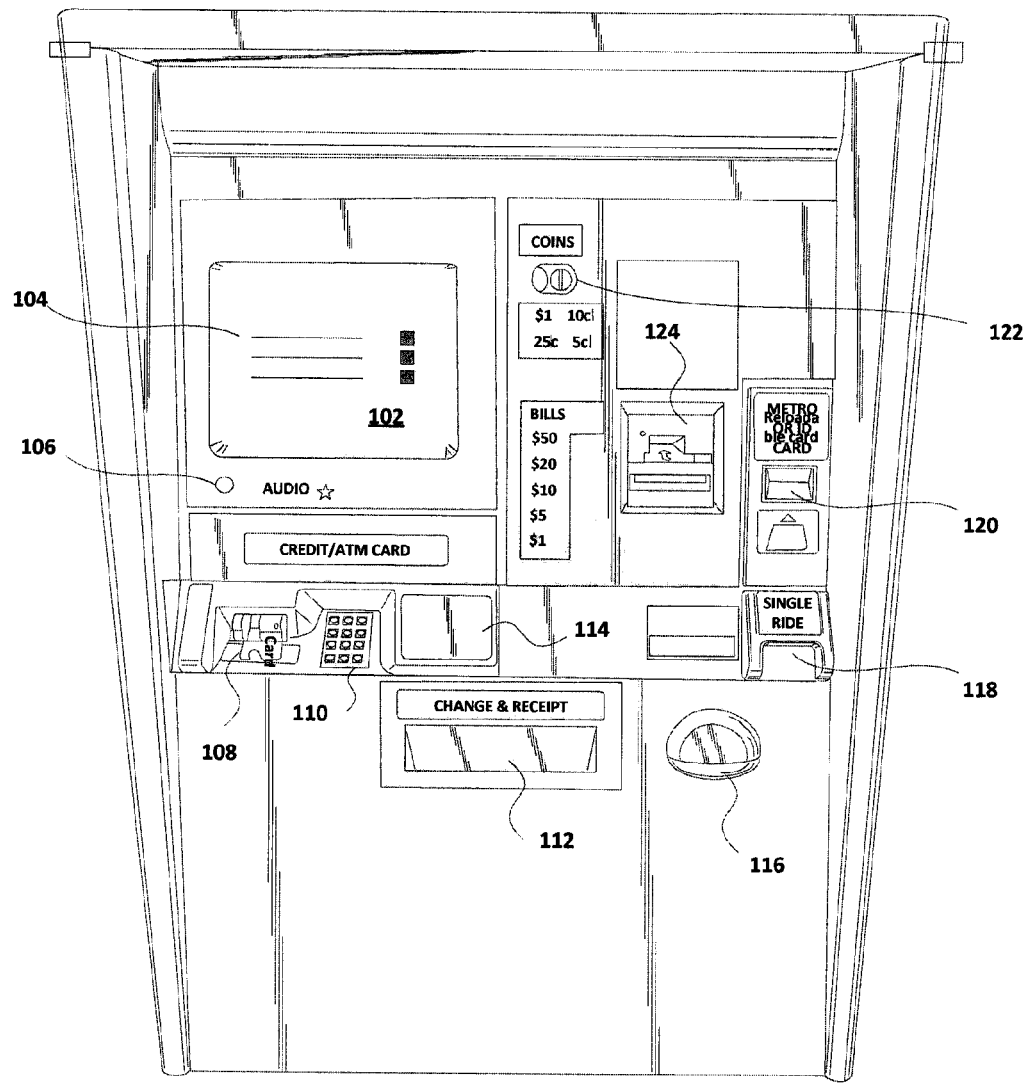
FIG. 1 depicts a video ticket office vending machine according to embodiments.

FIG. 1 depicts one embodiment of a vending machine 100 for use in the systems and methods described herein. Vending machine 100 may include one or more displays 102 on which information related to products and/or services available from a selected remote source, details related to the transaction, instructions on conducting transactions, videos, and/or any other information may be provided. In some embodiments, vending machine 100 may have a first screen configured to display a user interface to conduct transactions, while a second screen is used to provide instructions and/or host videos, such as video communications with an agent of a ticket office of a transit system. In other embodiments, a single display 102 may be used for displaying all available content. Vending machine 100 may also include one or more input interfaces. For example, input interfaces may include a keypad 110, a touchscreen 104 on display 102, a voice command device such as a microphone, and/or any other mechanisms for allowing a user to input information. One or more payment readers may be included on vending machine 100. For example, payment readers may include a cash reader 124, a coin reader 122, a credit and/or debit card reader 108, other payment reader 114, such as a bar code scanner or near field communication (NFC) device, and/or any other device configured to read information stored on a payment medium.

In some embodiments, other payment reader 114 may also be configured to read various types of fare media, such as smart cards, mobile devices, and other fare media. A fare media and/or identification (ID) card reader 120 may also be provided. Vending machine 100 may include one or more printers and/or data writers for printing transaction items such as entry tickets, boarding passes, confirmation tickets, vouchers, receipts, and/or any other documentation related to a transaction. For example, a receipt printer 112 may be used to issue receipts of payments, refunds, and/or other transactions.

A fare media printer or writer 118 may be included to issue fare media, such as single ride tickets, smart cards, monthly passes, and the like. In some embodiments, change may be returned to a user in coin tray 116 and/or a cash dispenser. In some embodiments, cash dispenser may be a separate component, while in other embodiments, cash returns may be dispensed near receipt printer 112. In some embodiments, transaction items, such as transit media and receipts, will be issued electronically, rather than a printed hard copy being provided. Vending machine 100 may also include a camera, a speaker 106, and/or other audio/visual components to enable audio and/or video communication with a ticket office. Each of the components of the vending machine 100 may be controlled by the vending machine 100 locally, or remotely by the ticket office, such as when the vending machine is in a remote expert mode as described herein. Vending machine 100 may be operated in a passenger mode where a user may approach the vending machine 100 and interact with the vending machine in person and/or in a remote expert mode where an agent from a ticket office controls the software and/or hardware peripherals of the machine, such as when a user needs help completing a transaction.

Figure 2:
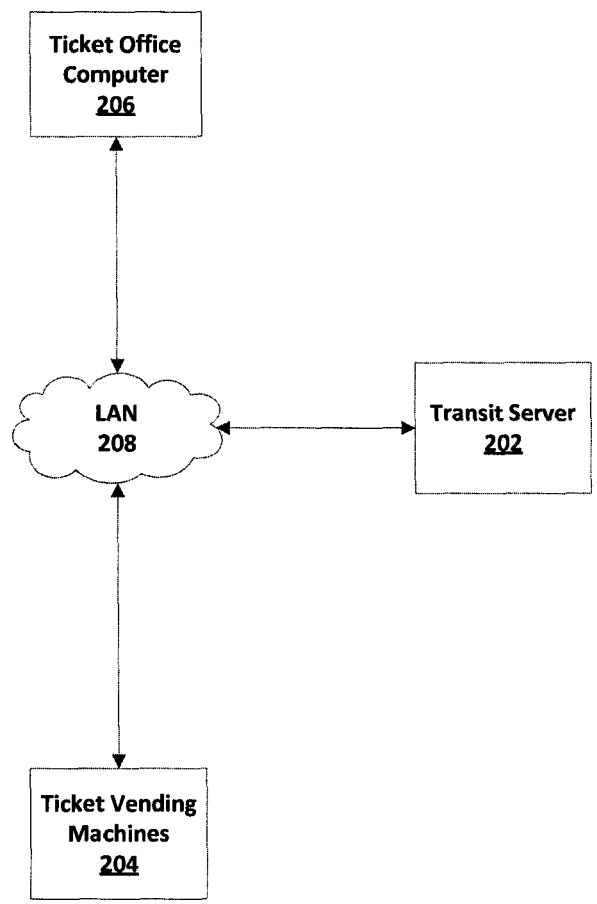
FIG. 2 depicts system diagram with a vending machine in communication with a central ticketing office according to embodiments.

FIG. 2 depicts a transit system 200 having a transit server 202 in communication with a number of transit fare vending machines 204 and at least one ticket office computer 206 or other remote device. In some embodiments, the transit server 202, vending machines 204, and/or ticket office computer 206 may be communicatively coupled using a local area network (LAN) 208 and/or other wired and/or wireless networks. Vending machine 204 may be a vending machine such as vending machine 100 described above. Transit fares may be purchased using vending machine 204. Information regarding these transactions may be communicated to the transit server 202, such as when account based fares are purchased. This allows information related to the transactions to be propagated throughout the transit system 200, such as to other vending machines 204 and to access control points. In some embodiments, a user may need assistance in using a vending machine 204 to conduct a transaction. The user may initiate a communication, such as a video chat, with an agent of the transit system using the ticket office computer 206. The agent may assist the user, and in some embodiments, may gain remote control of the functionality of the vending machine 204 to better assist the user in completing the transaction. The ticket office computer 206 may also be in communication with the transit server 202 in order to access information stored on the transit server 202, such as transit schedules, fare schedules, transaction history, as well as to provide information including transaction information to the transit server 202.

As described above, an agent using a ticket office computer may assist a user in completing a transaction. This is especially true when trying to complete a complex transaction, such as a refund transaction. If during communication with the user, an agent wishes to further aid the user, the agent may initiate an "expert mode" of the vending machine. When in expert mode, the agent may gain access to some or all of the software or hardware functionality of the vending machine. This enables the agent to process all or part of the transaction. In some embodiments, expert mode may unlock additional functionality not normally available at the vending machine. For example, a transit authority may wish to offer the ability for a user to get a refund at a vending machine, but may not want the user to complete this type of transaction without an agent overseeing the process.

FIG. 3 shows one embodiment of a display 300 of a ticket office computer or other remote device in expert mode with a vending machine 318. Vending machine 318 may be similar to vending machine 100 described above and may include a display 302 with a user interface (UI) portion 310 that allows a user to carry out functions of the vending machine 318. For example, the UI portion 310 may include input areas for searching transit schedules, purchasing transit fares, asking for assistance from an agent, and/or other functions. In one example, an assistance button 312 may be included that initiates a communication, such as a video chat, with an agent at a ticket office. The display 300 of the remote device may include a user interface 306 and an expert mode section 314. The expert mode section 314 may be linked to specific vending machines or other devices. Here, expert mode section 314 is linked with vending machine 318 and allows the agent to communicate a print instruction to the vending machine 318. When the instruction is received, a printer 316 of the vending machine 318 then prints and issues a fare media according to the instruction. The expert mode allows the agent to control any function the vending machine 318 is capable of performing, such as completing transactions, controlling hardware features, and the like. The expert mode section 314 provides an interface for the agent to control the vending machines. As several vending machines may be accessible by the ticket office computer, the expert mode section 314 interface may be tailored to the functionality of the particular vending machine that the agent is presently in communication with.

Figure 4:
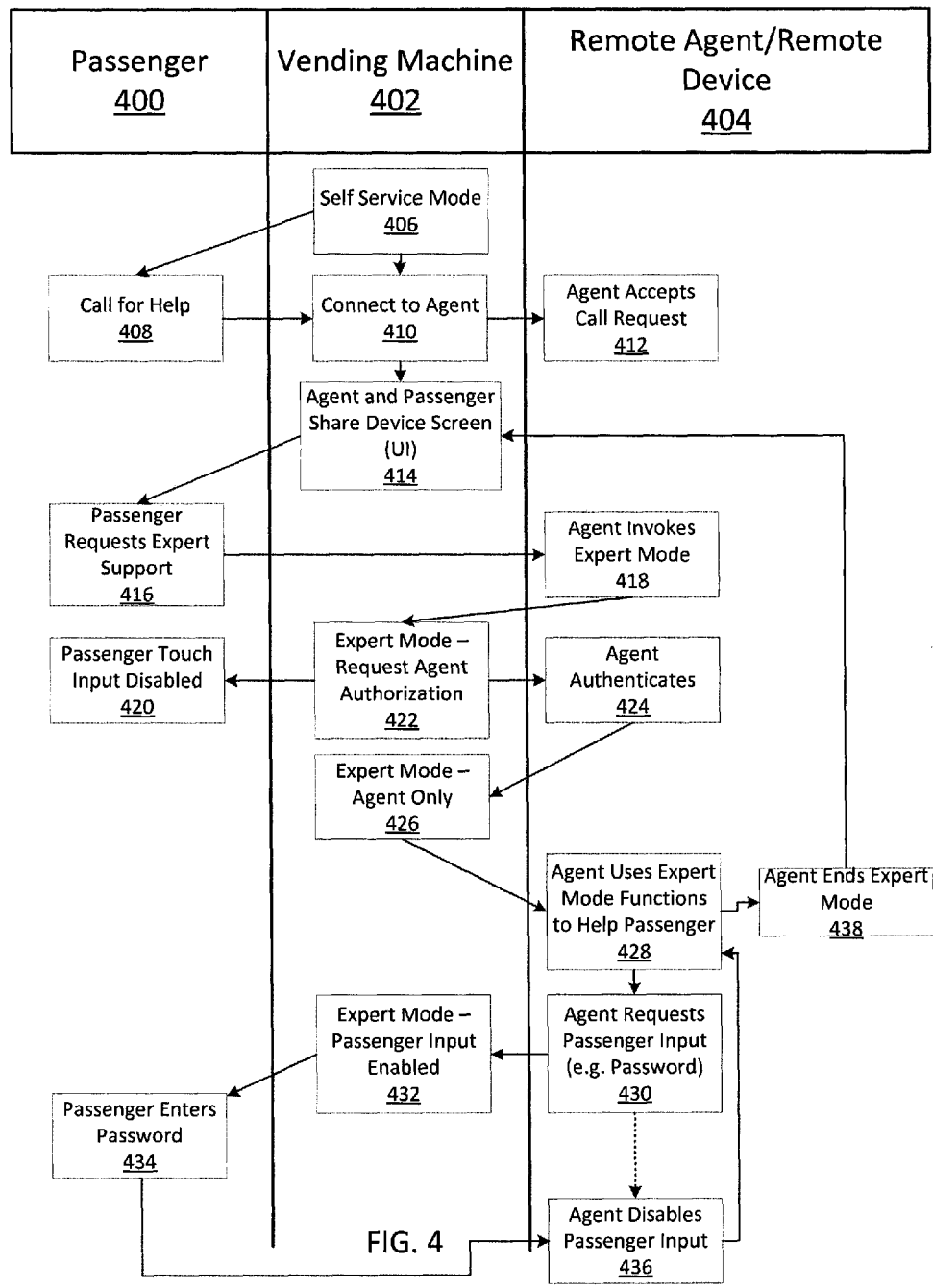
FIG. 4 is a swim lane diagram showing communication between a remote device of a central ticketing office and a vending machine according to embodiments.

FIG. 4 is a swim lane diagram showing interactions between a user 400, a vending machine 402, and an agent and/or remote device 404. The vending machine 402 may be located near a transit stop and be in a self-service mode at 406 and may include similar features as vending machine 100. In self-service mode, the vending machine 402 may be accessed by the user 400 to purchase fares, view transit schedule, and the like. In some cases, user 400 may need assistance in completing a transaction or otherwise operating the vending machine 402 and may call for assistance at 408. The user 400 may be connected to the remote agent 404 at 410 after the agent 404 has accepted the call request at 412. The call may utilize a communications interface of the vending machine 402 and may be an audio call or a video chat. In some embodiments, a display of the vending machine 402 may be shared with the remote agent 404 such that the agent 404 may better understand the reason for assistance. In some cases, the agent 404 will then be able to direct the user 400 on how to complete the transaction or other process as the agent 404 may reference items seen on the user's screen. However, oftentimes the agent may find it easier and/or quicker to provide more direct help in the form of completing the transaction. This may be done by sending instructions to the vending machine 402 from the remote device. In other embodiments, the user 400 may request that for the agent 404 to instruct the vending machine 402. Expert mode may be requested by the user 400 at 416 and/or may be initiated by the agent at 418.

When in expert mode at 422, the vending machine 402 may disable passenger input devices, such as keyboards, touch screens, and the like, to ensure that the agent 404 may complete the transaction and/or finish performing any necessary functions without interference from the user 400. Additionally, in embodiments where enhanced functionality is provided when in expert mode, disabling the input devices ensures that the user 400 does not have access to functions of the machine not intended for the user 400. In some embodiments, the agent 404 may be prompted to enter identity credentials, such as a user name and/or a password such that the agent may be authenticated at 424. Authentication may be used not only to ensure that the agent 404 is authorized to operate the expert mode, but may also determine a level of control or level of permissions the agent 404. For example, a supervisor may have increased permissions compared to a standard agent. The authentication process may be used to determine the identity and control level of the agent 404 such that the proper functionality of the vending machine 402 is enabled.

Once authenticated, the vending machine 402 may be controlled in expert mode at 426. Here, a computer or other remote device of the agent 404 may have an interface that is configured to control the function of the vending machine software and/or hardware components. The agent 404 may then execute one or more functions of the vending machine 402 in accordance with helping the user 400. For example, the agent 404 may display fare and transit schedules, complete a transaction, issue fare media, handle payments, and/or other functions. Once the agent 404 has fully assisted the user 400, the agent 404 may terminate expert mode at 438, thus returning the vending machine 402 to a self-service mode.

In some embodiments, certain vending machine operations may require user input. For example, authorizations for payment or selection of transit fares to be purchased may require permission from the user 400. In such instances, the agent 404 may request passenger input at 430. The vending machine 402 may then enable one or more input devices of the vending machine 402 at 432. In some embodiments, the enablement of input devices may be limited, for example, to only allowing a user to enter identity credentials, such as a username and/or password, without enabling access to any other portion of the user interface of the vending machine 402. The user may enter the identity credentials at 434 as permission to complete the operation. Once the identity credentials are received, the agent 404 may again disable the input devices at 436. The transactions and/or other operations may then be completed and the agent 404 may exit expert mode at 438.

Figure 5:
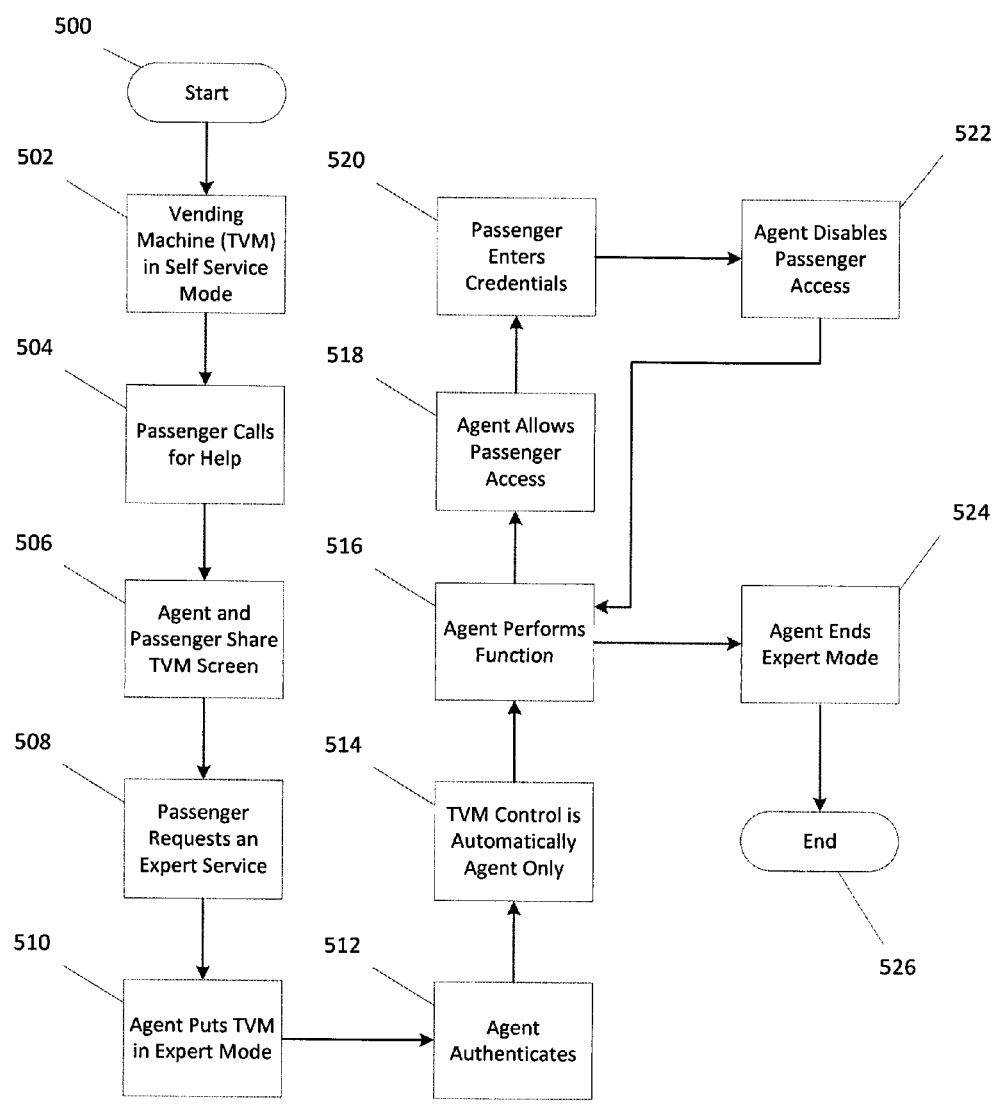
FIG. 5 is a flowchart showing a process for using a remote expert mode of a vending machine according to embodiments.

FIG. 5 is a flowchart depicting one embodiments of a process for using an expert mode of a vending machine. The process starts at 500 with the vending machine being in a self-service mode at 502. The vending machine may be vending machine 100 or 318 described above. At 504, a passenger calls for assistance, such as by initiating a video call. The user and a remote computer controlled by an agent at a ticket office may share a display of the vending machine at 506. For example, the agent may view an image of the information on a display of the vending machine to better guide the user. The passenger may request an expert mode session at 508, and the agent may initiate expert mode at 510. The initiation of expert mode enables the agent to remotely control the vending machine using a remote device that is connected with the vending machine through a network, such as LAN 208 described above. The agent may be authenticated at 512 and the vending machine's input devices may be disabled at 514 to prevent interference by the user while the agent is providing assistance. The agent then may perform the desired function at 516 before ending expert mode at 524, thus ending the process at 526. In some embodiments, user authentication is required prior to completing a transaction and/or other function. In such embodiments, the input devices of the vending machine are enabled at 518 and the user may enter identity credentials at 520. The agent may then again disable the input devices at 522 prior to completing the function and/or transaction.

Figure 6:
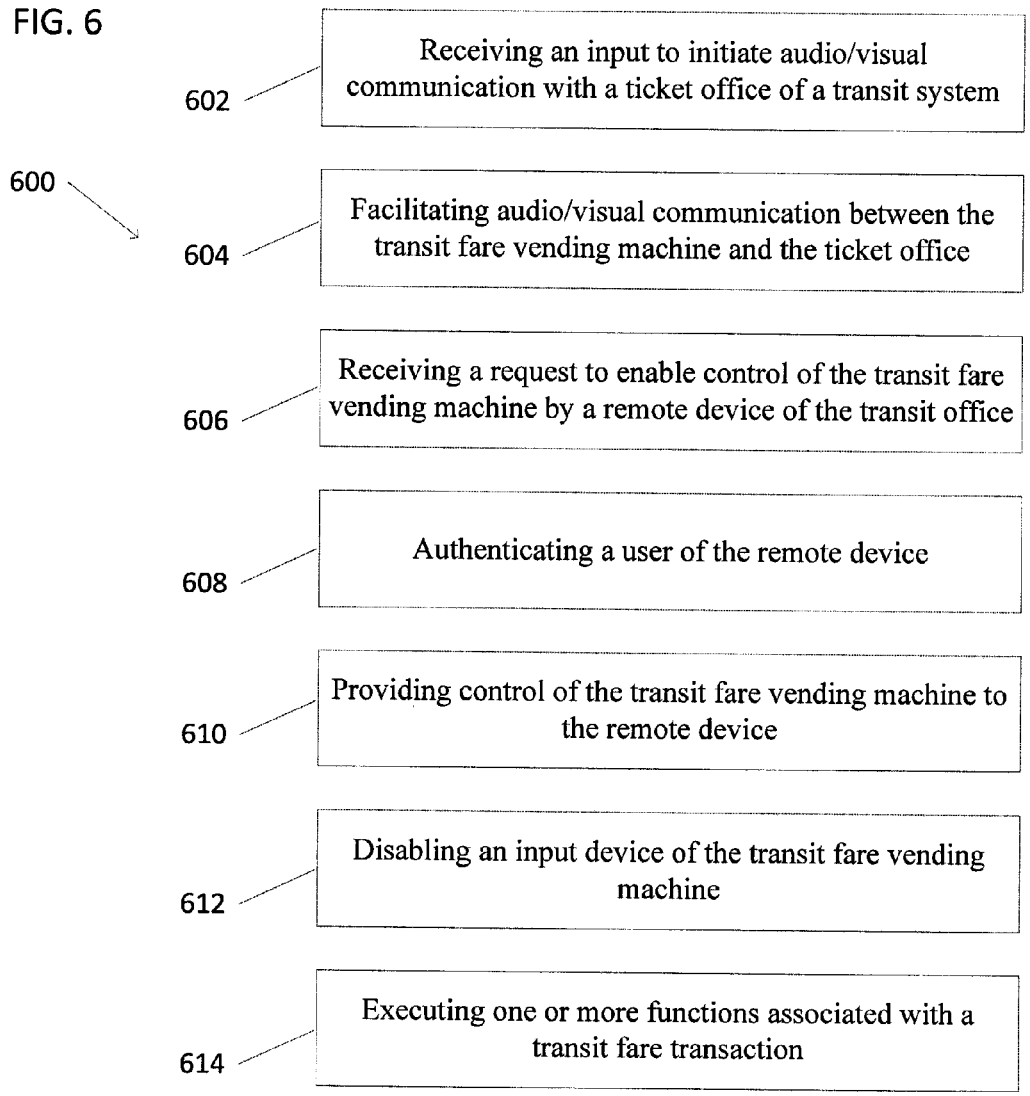
FIG. 6 is a flowchart showing a process for controlling a function of a vending machine according to embodiments.

FIG. 6 depicts a flowchart of a process 600 for controlling a function of a vending machine. Process 600 may be performed, for example, by vending machine 318. At 602, an input to initiate audio/visual communication with a ticket office of a transit system is received at a vending machine. Oftentimes, this input is received by a user pressing a "need assistance" button. This button may be a physical button located on the vending machine and/or may be a virtual button provided on a user interface presented on a display, such as a touchscreen of a vending machine. Once the button is pressed, the vending machine may be connected with a remote device of the ticket office and an audio/visual communication may be established. The communication may be a video chat that allows an agent or other user of the remote device to talk to the user of the vending machine face to face. In some embodiments, the agent may be able to see an image of the vending machine's screen such that the agent may better understand the user's problems and/or to better direct the user on how to interact with the vending machine to complete a desired task. The process 600 may also include receiving a request to enter an expert mode such that control of the vending machine is granted to the remote device at 606. In some embodiments, the request may be received from an input device of the vending machine, such as when a user requests that the agent perform a task. More commonly, the agent provides the request from the remote device. Upon receipt of the request, the agent may be authenticated at 608. The authentication may include the agent providing one or more identity credentials such that the agent's identity may be verified and/or a level of permission associated with the agent may be determined. The agent's level of permission may enable greater or lesser control of the functionality of the vending machine. In some embodiments, an agent may not have the necessary permission to complete a task and may transfer the video call and/or expert mode session to a second remote device. A higher level user of the second remote device may then be authenticated, and greater access may be provided.

Upon successful authentication, control of some or all of the functionality of the vending machine may be granted to the agent and the remote device at 610. Oftentimes, the input devices of the vending machine are disabled at 612. This ensures that the user does not interfere with the actions of the agent and/or have access to features and functions that were not meant for public use. The agent may perform one or more functions associated with transit fare media transactions at 614 before ending the expert mode. In some embodiments, the one or more functions may require authorization from the user. For example, functions requiring payment by the user may require the user's identity to be verified. In such cases, the input devices of the vending machine may be enabled temporarily to allow the user to enter identity credentials. The input devices may then be disabled again to allow the agent to complete the desired tasks without interruption. Once the expert mode has been ended, control of the vending machine by the remote device is terminated and any input devices of the vending machine are enabled such that the vending machine is again controllable by the user.

In some embodiments, an agent may find it helpful to share his screen with the user of the vending machine. Screen sharing may be used to provide directions to the user on how to operate the vending machine and/or may be used to provide additional information to the user. For example, updated transit schedules and/or arrival times may be provided to the user in this manner.

FIG. 7 depicts an embodiment of screen sharing between a screen 700 of a remote device and a display 702 of a vending machine, such as vending machine 100. In some embodiments, the remote device may be communicatively coupled with a number of vending machines. A user interface 706 may include a portion that presents a list of the vending machines the remote device is in communication with. The agent may elect to share a portion of the screen of a remote device within a particular vending machine, and may select a portion of the screen, such as by highlighting or outlining a selected area 704. By making a portion of the screen selectable, the agent may prevent employee-only information from being seen by the user and/or may only provide relevant information to the user. This may aid in making the purchase process simpler and less confusing for the user.

Once the selected portion is identified, an image 708 of the selected area 704 may be presented on the display 702. The image 708 may be overlaid atop an existing user interface 710 of the vending machine, such that the existing user interface software may still run in the background. In some embodiments, the selected area 704 may include dynamic data, such as real-time arrival times, or other information in the selected area 704 may be updated or changed for various reasons. The selected area 704 may be monitored to detect any dynamic or other changes. The image 708 may then be updated in real-time to reflect the detected changes.

In some embodiments, along with the shared screen, screen touches and other interactions made by the agent on the remote device may be shared. This may include providing an indication, such as an icon or other image to direct the user. For example, an icon 712, such as a mouse pointer, may be used to show the user a portion of the selected screen to which the agent is referring. The icon 712 may be the same or different than an icon 712 as seen on the screen of the remote device, and may mimic any interactions done on the remote device, such as keystrokes, screen touches, and/or mouse clicks. The screen touches may be shared by capturing screen coordinates of the interaction on the screen of the remote device, sending the coordinates, or pixel locations, to the vending machine, and making the screen touch appear on the display of the vending machine in a location corresponding to the coordinates. In some embodiments, the agent may select a screen touch image or icon to display on the image. Screen touch indications may also include highlighting a portion of the image, flashing a portion of the image, providing a video, text, and/or animation.

Figure 8:
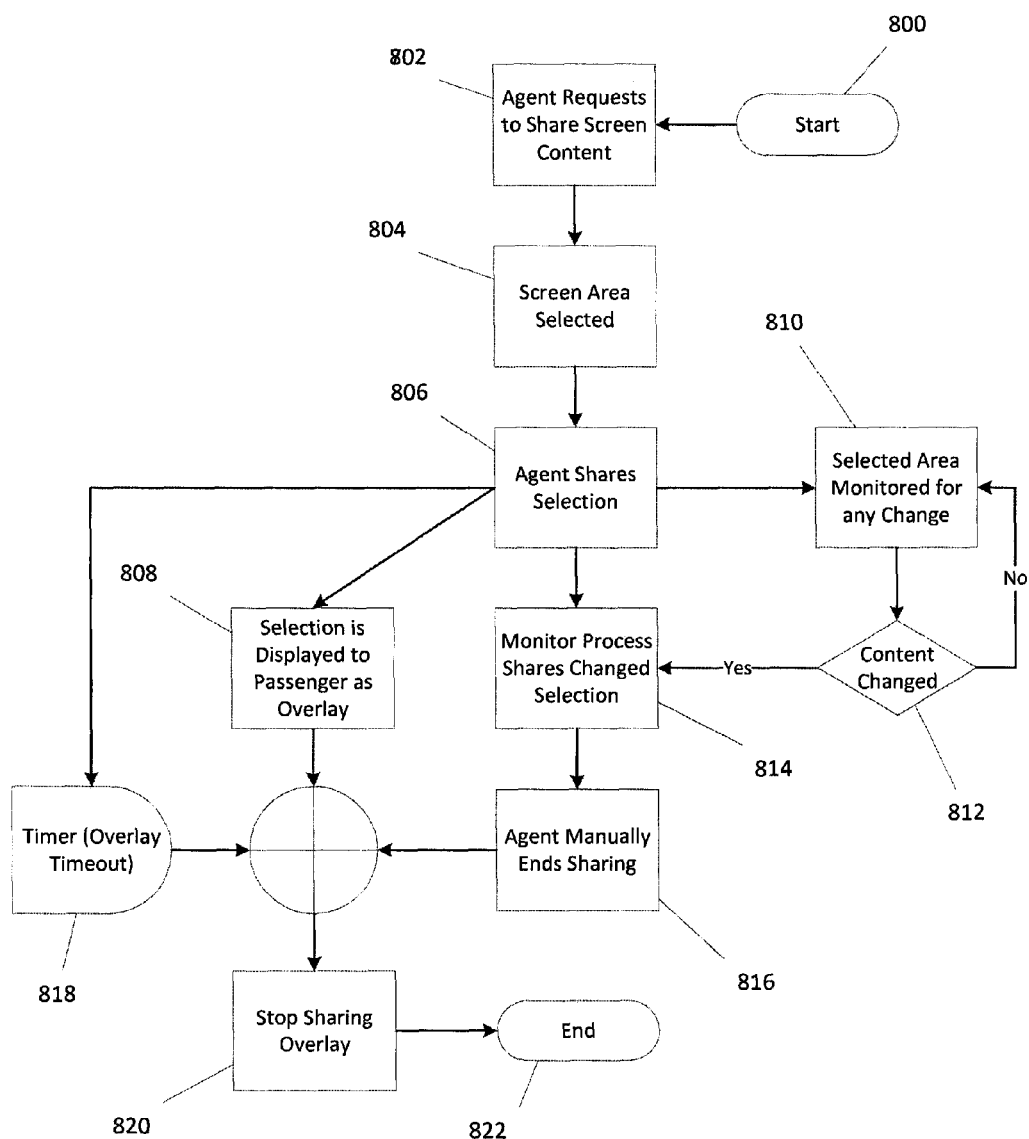
FIG. 8 is a flowchart depicting a process for screen sharing using a vending machine according to embodiments.

FIG. 8 is a flowchart depicting a process for sharing screen content between a remote device and a vending machine. At 800, the process begins and an agent may request to share the screen content of a remote device with a vending machine at 802. The agent may then select all or a portion of the screen of the remote device to be shared at 804. At 806, the remote device shares the selected portion with the vending machine. This selected portion may be presented as an image overlaid on an existing user interface of the vending machine at 808. In some embodiments, a vending machine may have multiple displays. A selection of a display for the overlay to be displayed on may be made. At 810, the selected portion may be monitored for any changes, dynamic or otherwise. A determination of whether any change has occurred in the selection portion is made at 812. If no change has occurred, the selected area continues to be monitored at 810. If a change is detected, the image of the selected area is updated to reflect the detected change at 814. The screen share session may be ended in multiples ways. For example, the agent may manually end the screen sharing once a transaction or other function has been completed at 816. In other embodiments, a timer may be used to determine if an amount of time the overlay image has been provided exceeds a threshold at 818. If so, the vending machine may terminate the screen share. The screen sharing is terminated and the overlay removed at 820, ending the process at 822. In some embodiments, an agent may wish to trigger the display of pre-generated content on a user's device, such as a transit fare schedule. The vending machine may receive a request to provide this information and present the pre-generated content on at least a portion of the display.

Figure 9:
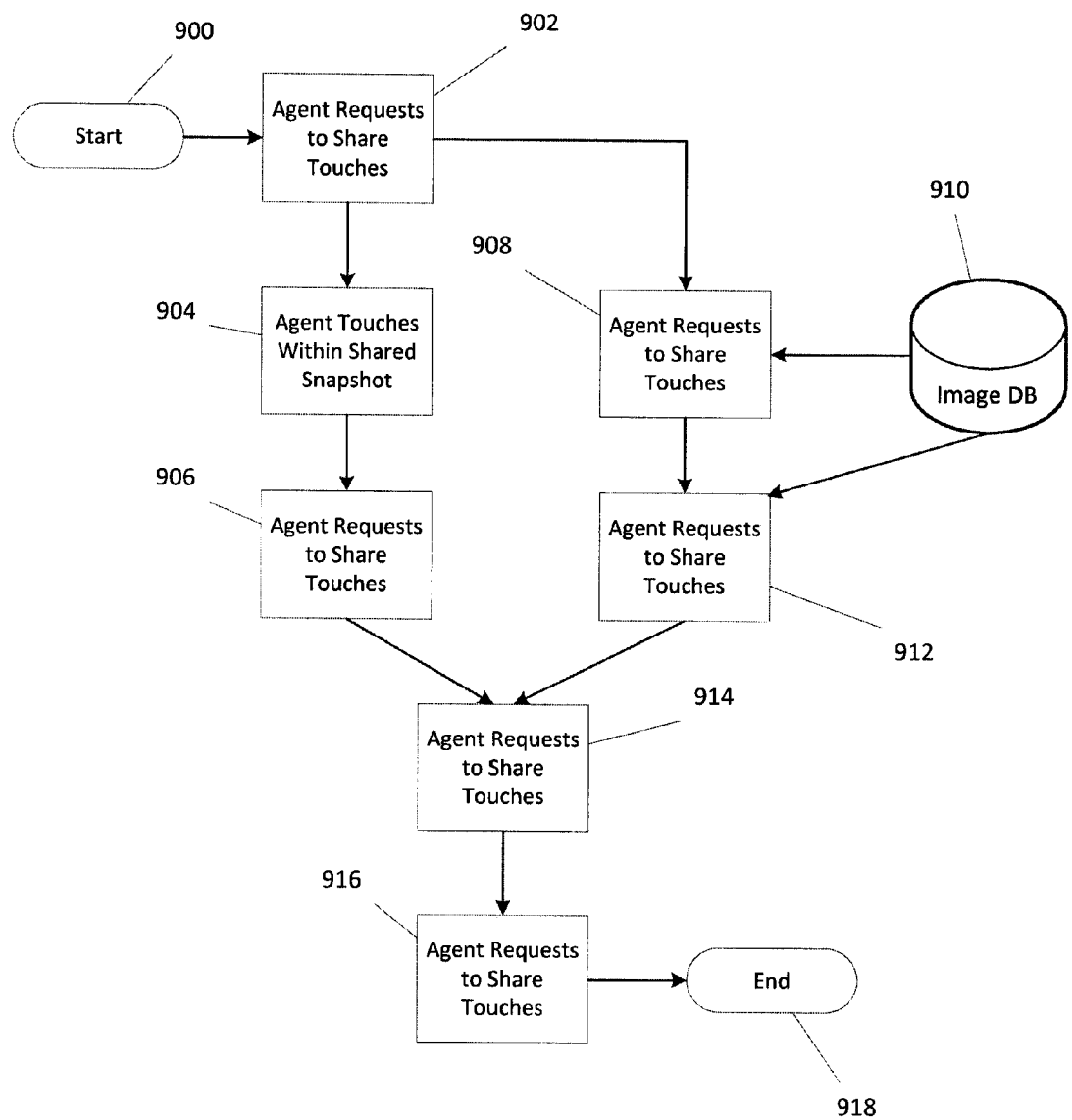
FIG. 9 is a flowchart depicting a process for screen touch sharing using a vending machine according to embodiments.

FIG. 9 is a flowchart depicting a process for sharing screen touch content between a remote device and a vending machine. The process may be a sub process of the screen sharing process described in FIG. 8, and oftentimes is commenced after the screen sharing process has begun. At 900, the process begins and an agent may request to share screen touches at 902. At 904, the agent touches within the selected portion of the screen of the remote device. Coordinates of this touch are sent to the vending machine. In some embodiments, the coordinates are sent to and stored within an overlay manager of the vending machine. The screen touch content may then be presented on the image overlaid on the display of the vending machine at 914. For example, an indication may be shown at a location of the image corresponding to the coordinates of the selected portion. In some embodiments, the agent may have the ability to select what the indication looks like on the image. The agent may select a form of a touch indication at 908, such as from an image database 910. The vending machine and/or overlay manager may receive the selected indication at 912 to be presented on the image. In some embodiments, an image of the indication may be sent from the remote device to the vending machine, while in other embodiments an identifier of the selected indication may be sent to the vending machine such that the vending machine may retrieve the selected indication from the image database 910. The agent may end the screen touch sharing session at 916, ending the process at 918.

Figure 10:
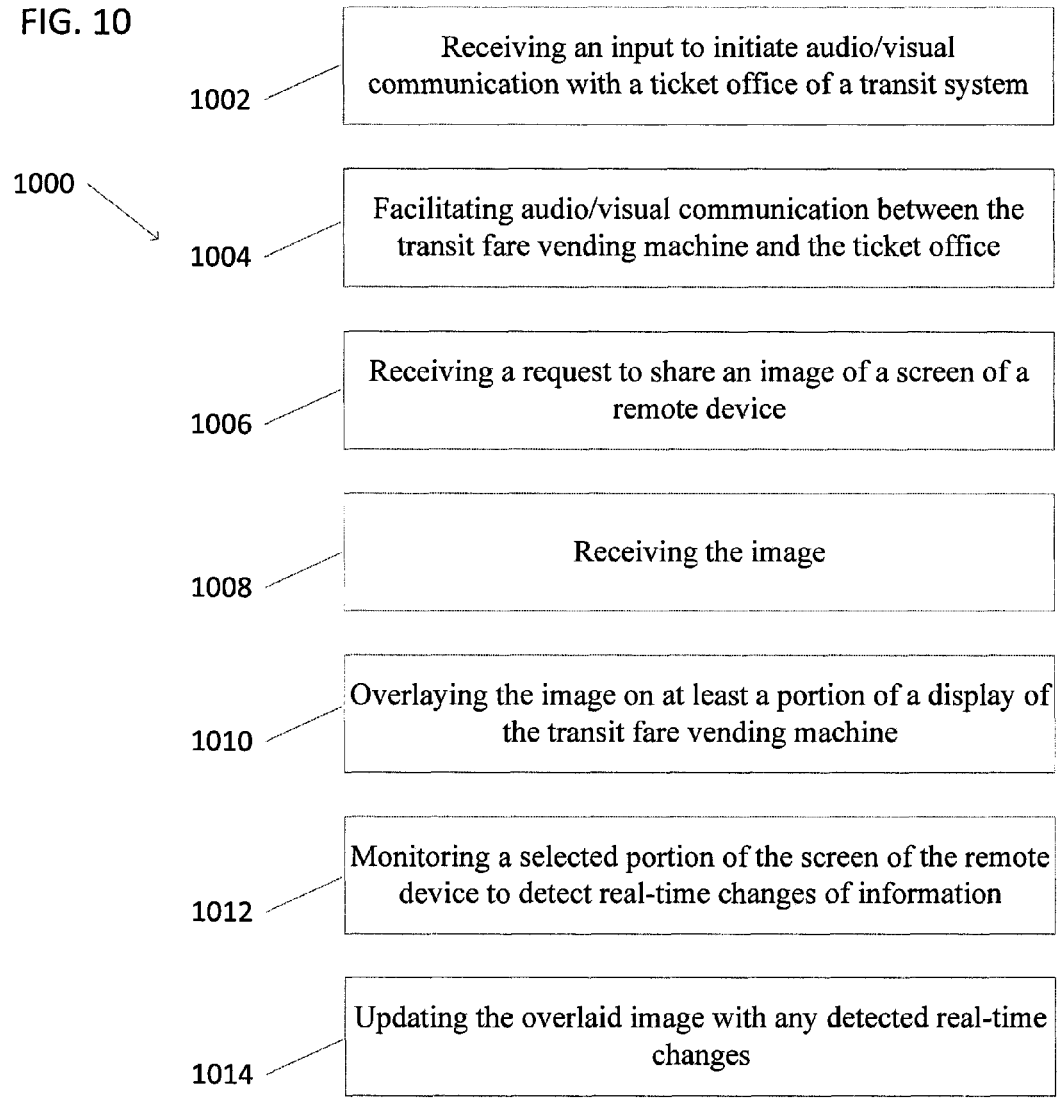
FIG. 10 is a flowchart depicting a process for screen sharing using a vending machine according to embodiments.

FIG. 10 is a flowchart depicting a process 1000 for sharing a screen from a remote device to a transit fare vending machine, such as the vending machine of FIG. 7. At 1002, an input to initiate an audio/visual communication with a ticket office of a transit system is received. The audio/visual communication may be established between the vending machine and the remote device at 1004. A request to share an image of at least a portion of a screen of the remote device is received at 1006. An agent may select the portion of the screen to share. This selection may be received by the vending machine at 1008. The image may then be overlaid over at least a portion of a display of the vending machine such that a user interface of the vending machine is present beneath the overlaid image at 1010. The selected portion of the screen may be monitored to detect any changes to the selected content on the remote device at 1012. At 1014, any detected changes may be updated in real-time on the image shown on the vending machine display. This ensures that the most recent information is provided to the user. This is especially helpful when the image includes dynamic data, such as real-time transit schedules.

Oftentimes, vending machines that provide transit products are complex, having many different menus and functions available via a user interface, as well as having many different hardware peripherals. For example, many vending machines are configured to accept several forms of payment such as cash, coins, credit cards, debit cards, and funds from NFC devices. The vending machine may include multiple printers or scanner for issuing and/or reading various types of fare media, receipts, and the like. Due to the large cost of replacing an entire vending machine and/or transitioning entirely to a single fare media, transit systems often accept account based media, smartcards, standard fare cards and tickets, and the like. Vending machines are often equipped to establish transactions for some or all of these fare media. In some embodiments, vending machines may be configured to provide contextual indications to make using the complex machines easier for users.

Figure 11:
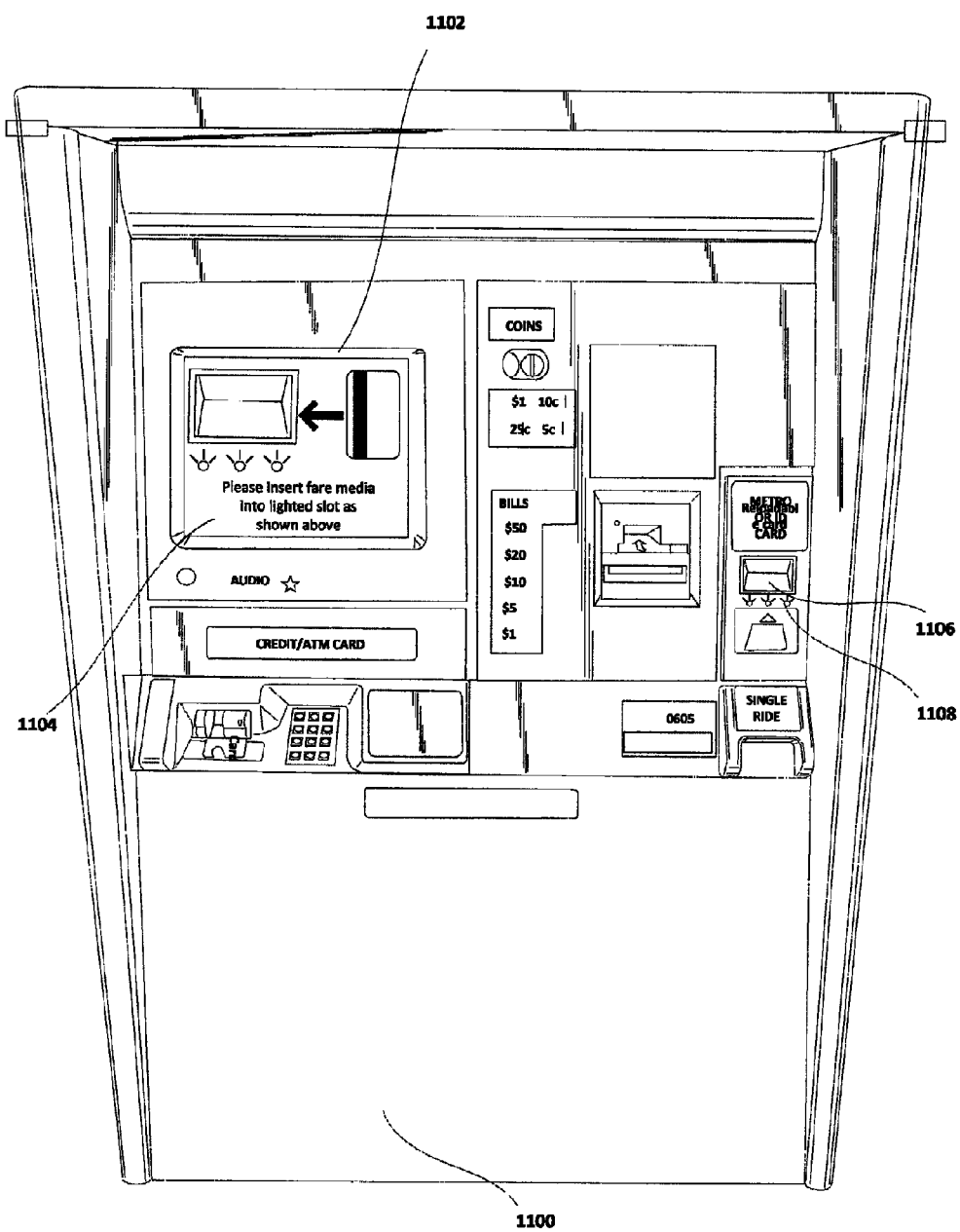
FIG. 11 depicts a vending machine using contextual indicators according to embodiments.

FIG. 11 depicts a vending machine 1100, similar to vending machine 100 described above. Vending machine 1100 includes a display 1102 on which an indication 1104 may be overlaid atop a user interface. For example, as a user operates the vending machine, the vending machine may detect what functions of the machine are needed to complete a transaction. A printer, a scanner, a payment reader, or the like may be needed to complete a transaction. As vending machine 1100 has a large number of components, indication 1104 may be presented to direct a user on how to complete a task. For example, indication 1104 directs a user to insert a fare media into a fare media reader 1106. The indication 1104 may include text, images, animations, and/or videos for directing the user on the operation of the hardware peripheral. Here, the indication 1104 shows an image of a fare media being inserted into the fare media reader 1106 and includes a textual description of the process. In addition, lights and/or sounds may be produced to aid the user. For example, an audio explanation of the operation of the hardware peripheral may be produced. Alternatively, or in conjunction with, the indications, one or more light elements, such as light emitting diodes (LEDs) may be positioned near one or more of the hardware peripherals. For example, light elements 1108 are positioned near the fare media reader 1106, and may be illuminated when the operation of the fare media reader 1106 is needed. The illumination may help direct the user to the proper hardware peripheral. In addition, sounds may be emitted from speakers proximate to the hardware peripherals such that a user may follow the sound to locate the proper hardware peripheral.

Figure 12:
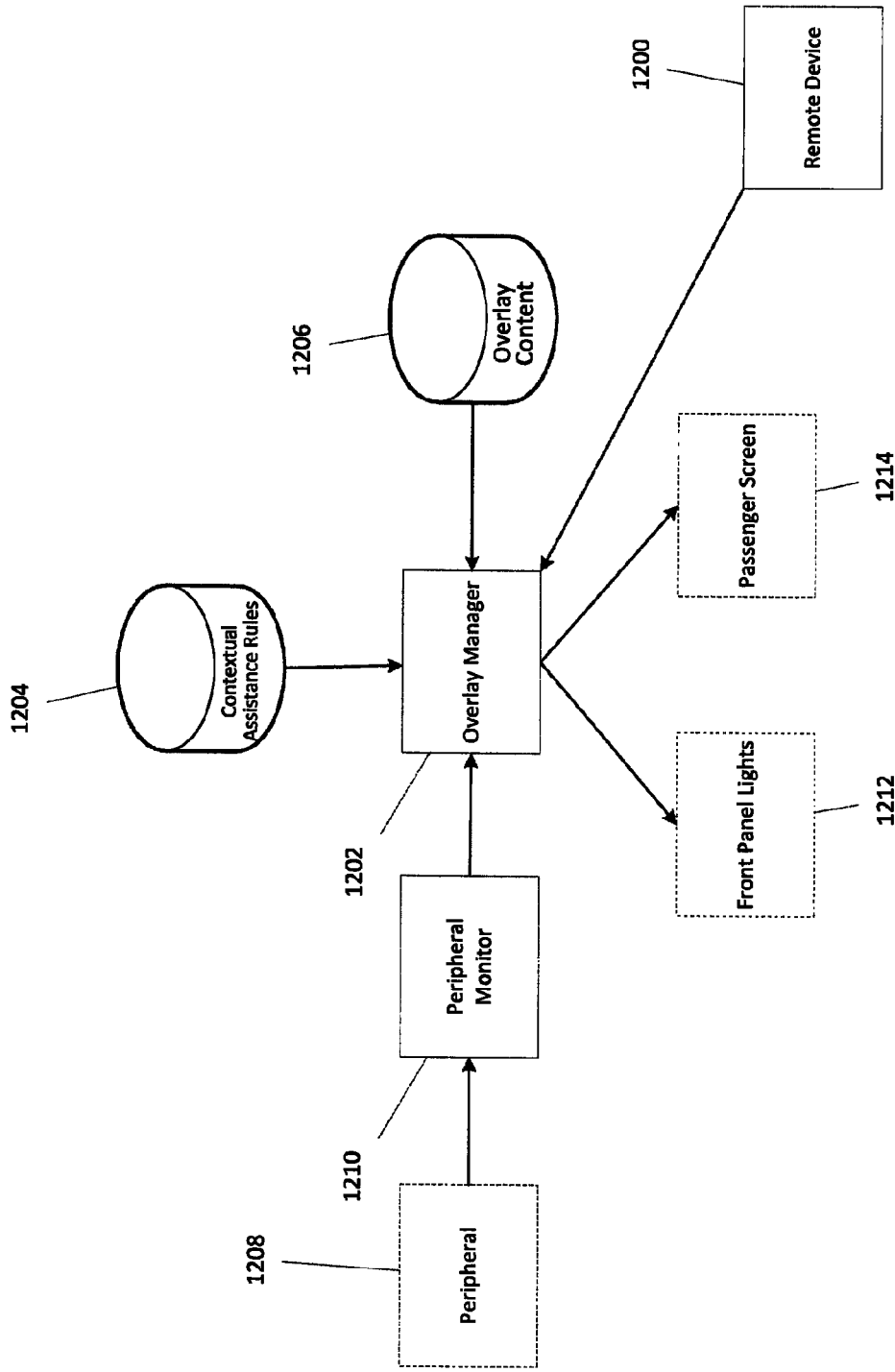
FIG. 12 is a system diagram of a vending machine configured to use contextual indicators according to embodiments.

FIG. 12 depicts a system for providing contextual assistance rules according to one embodiment. In some embodiments, a remote device 1200 may communicate a request to provide a contextual indication, such as when the vending machine is in a screen share session and the agent wishes to direct a user how to perform a particular action. This request may be received by an overlay manager 1202 of the vending machine. In other embodiments, interactions with a user may trigger a contextual indication. For example, the vending machine may detect a function to be executed, where the function includes the operation of one or more hardware peripherals 1208. The detection may be done by a peripheral monitor 1210 that monitors vending machine activity and detects when each hardware peripheral is needed. Upon detection of upcoming operation, the peripheral monitor may communicate the activity to the overlay manager 1202. The overlay manager 1202 may retrieve one or more rules for providing contextual assistance from a database 1204. These rules may direct the overlay manager 1202 to provide indications and/or illuminations on the vending machine to aid in the use of one or more hardware peripherals in association with the rules related to the operation. The rules may include what type of indication to provide, what light elements to trigger, a duration for any indications and/or illuminations, an order for providing any indications and/or illuminations, and/or other information related to carrying out the operation. For example, the rules may direct a light element 1212 near a fare media reader to illuminate until a fare media is received, such as described in FIG. 11. The rules may also direct an indication including images, text, and/or video to be overlaid on the user interface of the vending machine display 1214, similar to the indication 1104 of FIG. 11.

Figure 13:
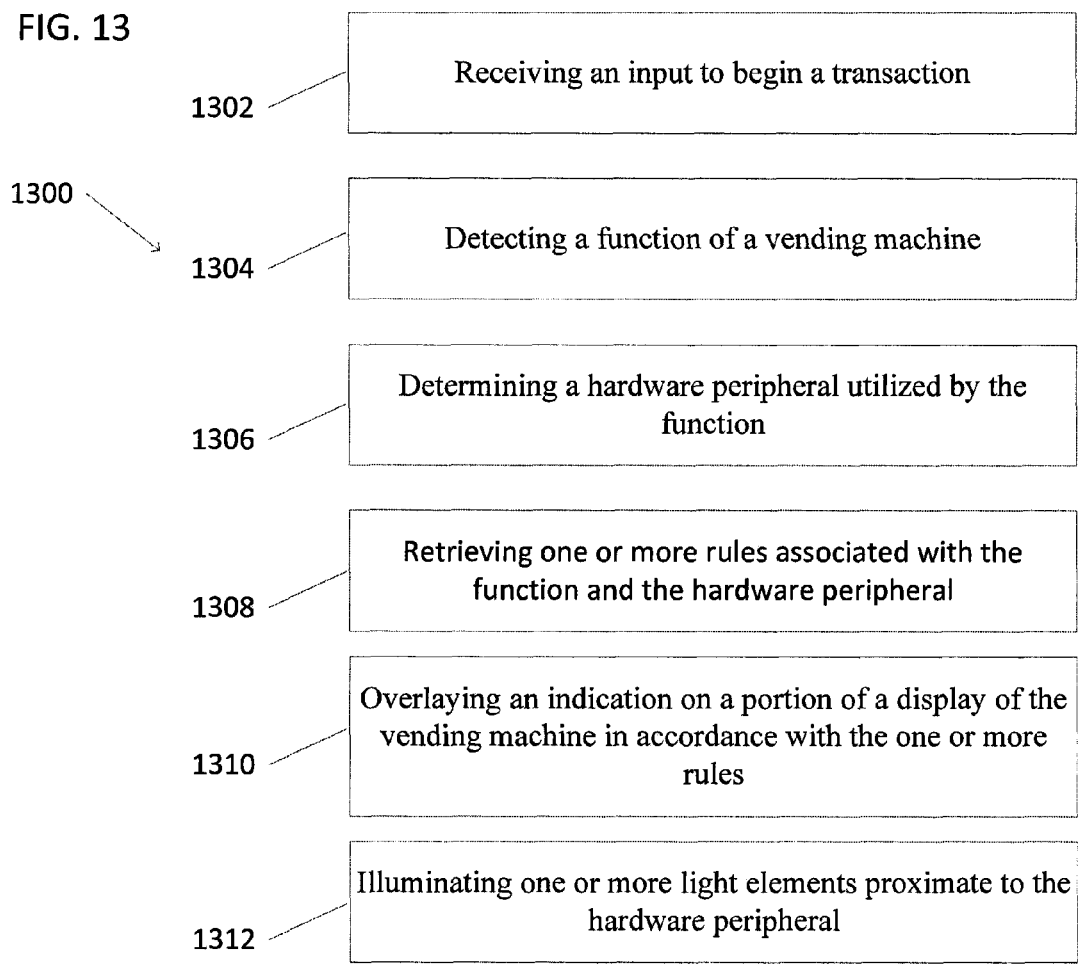
FIG. 13 is a flowchart depicting a process for providing contextual interface elements from external triggers of a vending machine according to embodiments.

FIG. 13 is a flowchart of a process 1300 for providing contextual interface elements from external triggers of a transit fare vending machine, such as vending machine 1100. At 1302, an input to begin a transaction may be received. The input may be a user touching an input device, such as a keyboard or touchscreen of a vending machine. At 1304, a function of the vending machine may be detected. The function may be based on the user's operation of the vending machine, and may involve the operation of one or more hardware peripherals of the vending machine. One or more hardware peripherals utilized by the function may be detected at 1306. Hardware peripherals may include, but are not limited to, a printer, a payment reader, a fare media reader, a fare media writer, and/or a scanner. As one example, a user may select a fare for purchase. The vending machine may detect that a payment media will be used to complete the payment. One or more rules associated with the function and the hardware peripheral may be retrieved at 1308. The rules may contain instructions on what kind of an indication to present on a display of the vending machine and/or what other forms of instruction to provide the user. For example, the instructions may command the vending machine to illuminate one or more lights near the hardware peripheral, such as the fare media reader, at 1312. In conjunction with, or alternatively, an indication may be overlaid on the display based on the one or more rules. Indications may include highlighting, an image, text, flashing a section of the display, an animation, and/or a video. The indications on the screen and illuminated lights may serve to identify a location of the operational hardware peripheral, as well as to instruct the user on how to operate the hardware peripheral. In some embodiments, a plurality of lights may be positioned in a pattern such that when illuminated in a linear or ordered pattern corresponding to a direct of insertion or removal of a material from the hardware peripheral. For example, a series of three light elements may illuminate from an outermost to an innermost light element to direct a user to insert a payment media into a payment reader. In some embodiments, a speaker may be used instead of, or in conjunction with, the light elements. The speaker may produce a sound to direct a user to the proper hardware peripheral.

Due to varying environments for vending machines, oftentimes default hardware settings may not provide the best user experience. For example, a shaded transit station may need different brightness and/or contrast settings than a vending machine exposed to the sunlight. Busier stations may require vending machines with higher volume levels than lower traffic stations. Additionally, the sensory perception of each individual user may vary from the next user.

Figure 14:
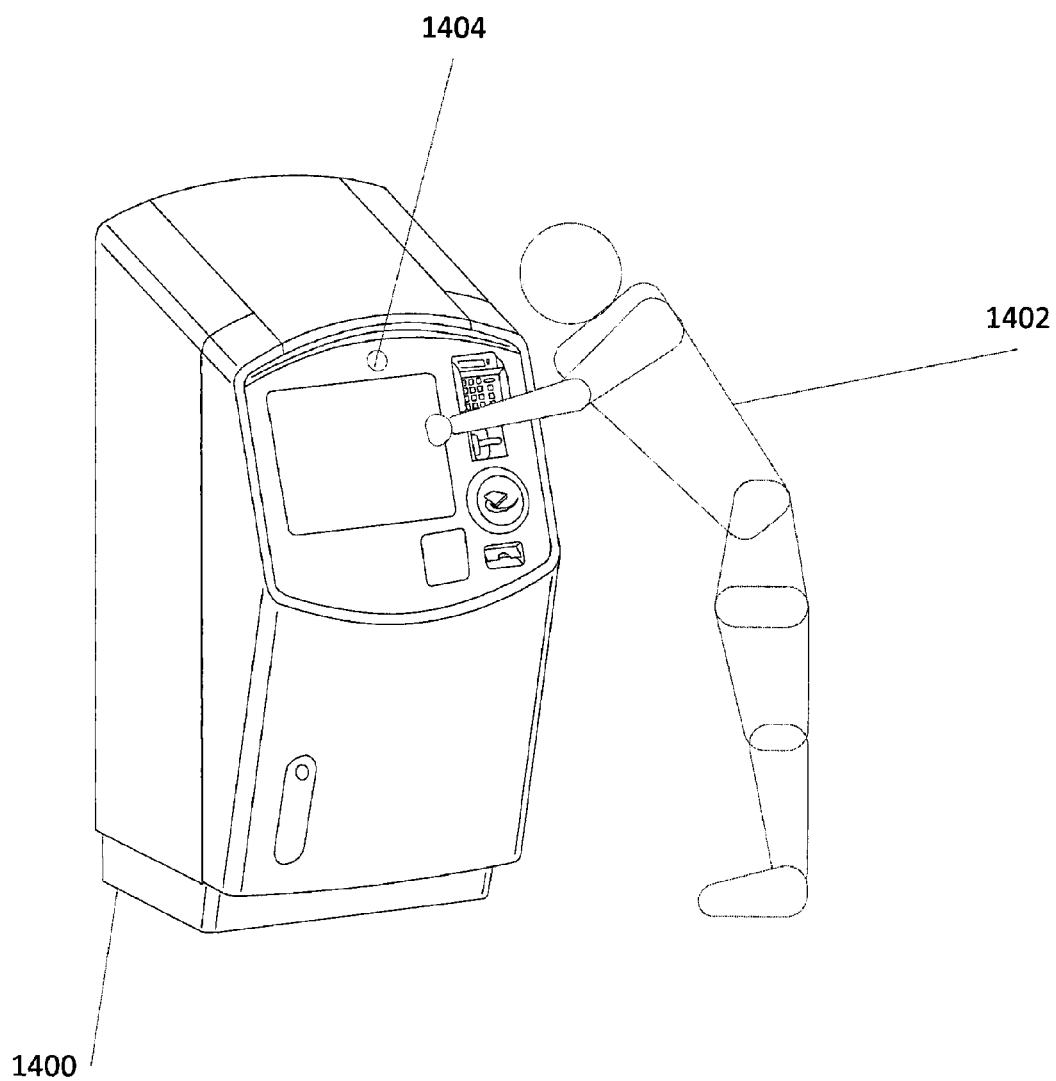
FIG. 14 shows a vending machine adjusting a parameter based on a detected interaction according to embodiments.

FIG. 14 depicts a vending machine 1400 that detects a user's interaction to adjust various parameters of vending machine hardware. Vending machine 1400 may correspond to vending machine 100 and may include one or more sensors 1404, possibly as part of a sensor interface, which are configured to detect behaviors and interactions of a user 1402. For example, user 1402 is leaning forward with his head near the vending machine 1400. This may be indicative of the user 1402 struggling to hear an audio/visual communication with an agent at a ticket office. This behavior may be detected by the sensors 1404. The behavior is then compared to a database of behaviors or responses, and if the behavior matches a response in the database, an associated remedy may be provided. For example, when the user 1402 is detected leaning closer to the screen and/or tilting an ear toward a speaker of the vending machine, the behavior may match a response associated with the volume being too low. If the user 1402 is detected leaning forward with his eyes near a display of the vending machine 1400, the behavior may match a response associated with a font being too small on the screen. The vending machine 1400 may then adjust a parameter of an associated hardware periphery accordingly. For example, the volume may be increased and/or the font size may be increased. In some embodiments, additional sensors may be included to make automatic parameter adjustments based on environmental conditions. For example, detection of a loudness or brightness of the environment may enable the vending machine 1400 to adjust default settings. In some embodiments, the environmental sensors may be used in conjunction with the sensors 1404 to further calibrate parameter settings for the user 1402.

Sensors may include ultrasound, cameras in combination with video analytics software, load sensors, ambient light sensors, volume sensors, infrared sensors, and/or any other sensors that may detect a user's interactions. Interactions may include body positions, gestures, and the like. Parameters that may be adjusted include font size, screen contrast, screen brightness, a volume level, and the like.

Figure 15:
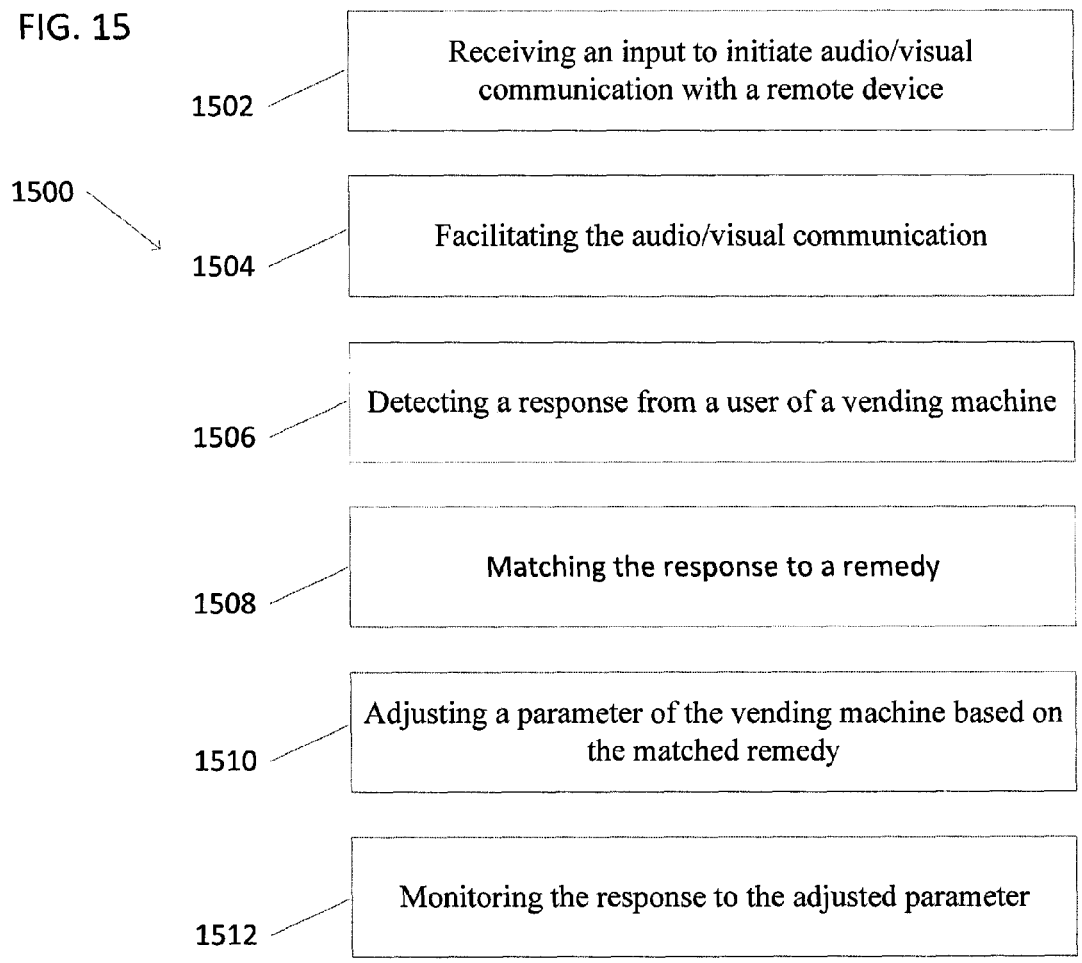
FIG. 15 is a flowchart depicting a process for automatically adjusting a parameter of a vending machine based on a user interaction according to embodiments.

FIG. 15 is a flowchart of a process 1500 automatically adjusting a parameter of a transit fare vending machine, such as vending machine 1400, based on a response. At 1502, an input to initiate audio/visual communication with a remote device of a ticket office is received. For example, the user may activate a button on the vending machine that triggers a video chat with an agent at the remote device. At 1504, the audio/visual communication is established. A response from the user of the vending machine is detected at 1506. The response may include a body position, gesture, and/or other behavior of the user. The response may be matched to a possible remedy at 1508. For example, a database of remedies may associate a number of responses with adjustments to parameters of various hardware peripherals of the vending machine. A parameter adjustment may be made based on the matched remedy at 1510. The user's behavior may be monitored after the adjustment to ensure that any issues have been resolved. If the user's behavior continues, or brings about a different reaction, additional adjustments may be performed. In some cases where adjustments have not resulted in a change in the user's behavior, the vending machine may send a prompt to the remote device instructing the agent to ask the user if the parameter levels are satisfactory such that any adjustments may be made manually.

In some embodiments, the database of remedies may be populated prior to the user's interaction. For example, a number of behaviors and responses may be pre-programmed and associated with parameter adjustments. Such responses may be identified based on previous interactions where a user interacted with the vending machine in a certain way, adjusted a parameter manually, and/or requested that an agent adjust a parameter. For example, a user may be conducting a video chat with an agent and struggle to hear the agent. The user may lean forward with an ear directed to the speaker. The user may ask the agent to increase the volume or the agent may notice the behavior and adjust the volume accordingly. These interactions may be logged and stored in the database with associated remedies. In some embodiments, the vending machine may continue logging user behavior and updating the remedies based on users' continued interaction. In this manner, the vending machine may continually adapt and learn such that better adjustments are made to provide the user with a comfortable and effective experience. In some embodiments, a user of the vending machine may be prompted to select whether the adjusted parameters should be set as default for the particular user, such as when the user enters his credentials or swipes a transit fare media. The vending machine may receive an input with this selection, as well as whether to apply the default to only the current vending machine or to all vending machines within the transit system.

While discussed as separate features, it will be appreciated that aspects of remote expert mode, screen sharing, screen touch sharing, contextual indicators, and/or parameter adjustments based on user interactions described in the above passages may be combined in any number of permutations. The vending machines and remote devices described above may be configured to execute any of these features to provide easy to use vending machines that still provide a full array of services without the need for designated on-site agents. Each of the features may be executed using existing software and/or add-on software such that existing vending machines and software infrastructure may be retained.

In some embodiments, existing vending machines may not include the necessary hardware to perform the functions described above. Oftentimes, vending machines do not include components that enable video chats, remote expert mode, screen sharing, screen touch sharing, contextual indicators, and/or parameter adjustments based on user interactions. Replacing entire vending machines may be particularly costly.

Figure 16:
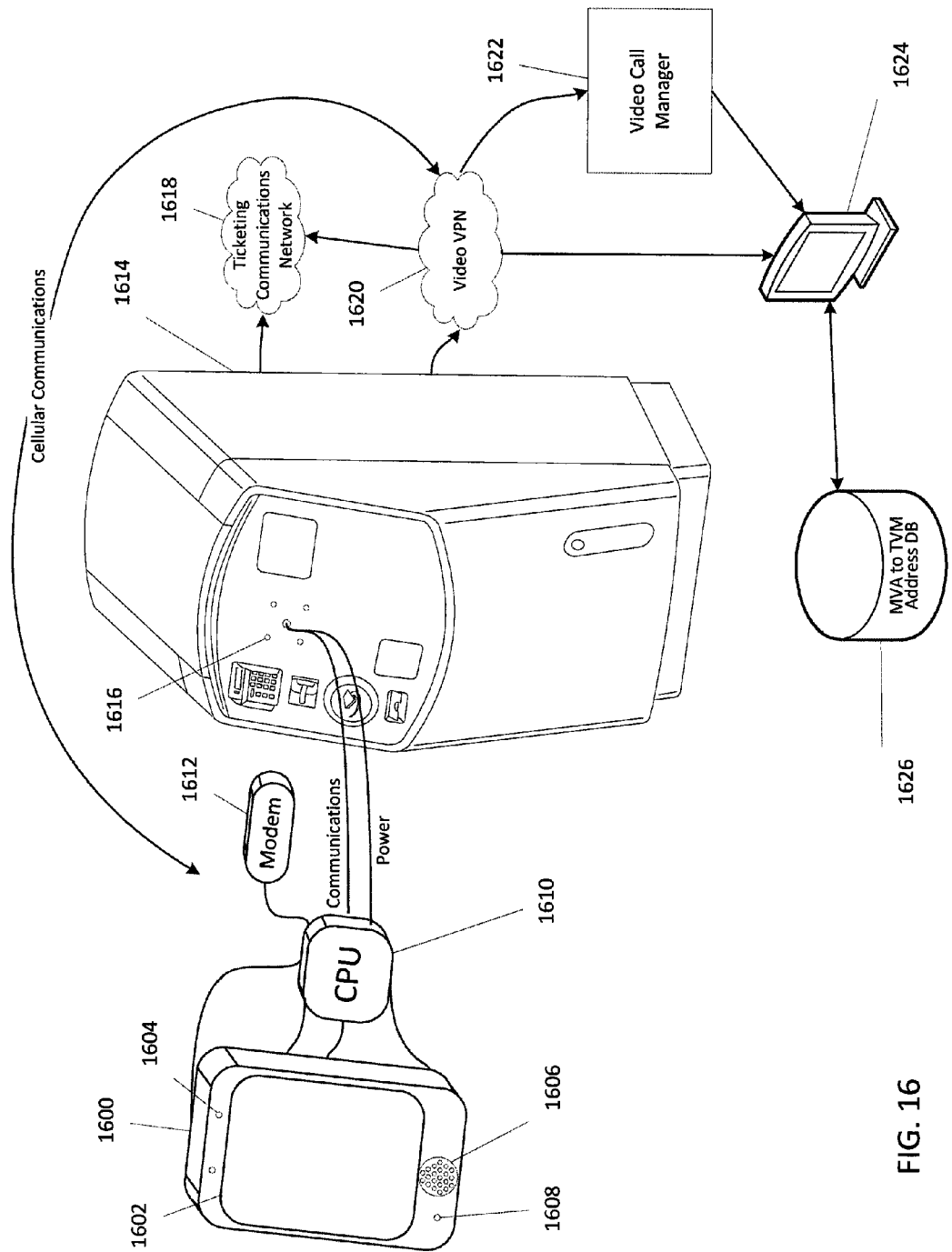
FIG. 16 shows an exploded system view of a video communications device and vending machine according to embodiments.

FIG. 16 depicts a system for retrofitting an existing vending machine 1614 with a video communications device 1600 configured to enable the performance of some or all of the functions described herein. Vending machine 1614 may include standard input devices, printers, scanners, and/or a display, but may lack audio/visual components such as cameras, a microphone, a speaker, and the like. Additionally, software of the existing vending machine 1614 may not support video chats and/or remote access.

Video communications device 1600 may include a display 1602, one or more cameras 1604, speaker elements 1606, and/or a microphone 1608. Components of the video communications device 1600 may be controlled by a processor 1610. The video communications device 1600 may be mounted to a housing the vending machine 1614 and electrically coupled with a power supply of the vending machine 1614 such that the video communication device 1600 receives operational power from the power supply. The video communications device 1600 may also be communicatively coupled with a communications interface of the vending machine 1614 such that video communications device 1600 may access ticket database and transaction information, such as information accessible through a ticketing communications network 1618, as well as control hardware and software operations of the vending machine 1614. For example, the video communications device 1600 may be coupled to the vending machine 1614 such that instructions to issue a fare media may be sent to the communications interface and relayed to a processor of the vending machine 1614, which then carries out a function in accordance with the instructions.

In some embodiments, the communications interface may be communicatively coupled with a remote device 1624 of a ticket office. This communication may be through a network, such as a virtual private network (VPN) 1620 for audio/video communications 1620. This VPN may route communications to a video call manager 1622 to assign calls to an agent and remote device 1624 and/or the VPN may be directly linked to a remote device 1624. The remote device 1624 may have access to an address database 1626 that includes a list of video communications devices 1600 that have been associated with vending machines 1614 such that the remote device 1624 knows the location of the user when assisting the user. In some embodiments, the vending machine communications interface may not support video chatting with the remote device 1624. Video communications device 1600 may include a modem 1612 and/or other network components such that video communications can be conducted with the remote device 1624 independent of the vending machine 1614.

Figure 17:
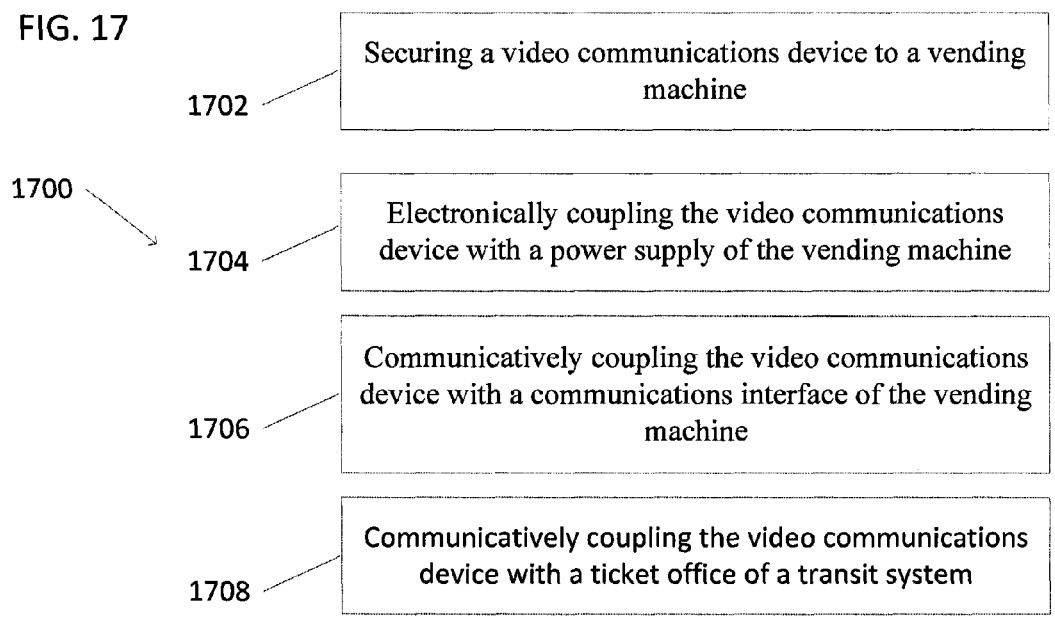
FIG. 17 depicts a process for retrofitting an existing vending machine with a video communications device according to embodiments.

FIG. 17. is a flowchart depicting a process 1700 for retrofitting a vending machine, such as vending machine 1614, with a video communications device. At 1702, a video communications device may be secured to a vending machine. The video communications device may be secured using a permanent and/or removable coupling method. For example, the video communications device may be welded onto a housing of the vending machine and/or secured with a mounting feature such as a bracket and/or fasteners. As one example, the video communications device may be bolted onto a mounting location on a housing of the vending machine. The video communications device is electrically coupled with a power supply of the vending machine such that the video communications device derives operational power from the power supply at 1704. At 1706, the video communications device is communicatively coupled with a communications interface of the vending machine. This enables remote control of vending machine functions, as well as the ability to conduct transactions using the video communications device. At 1708, the video communications device is communicatively coupled with a remote device of a ticket office such that audio/visual communications between the vending machine and the remote device are enabled. The video communications device may include a communications interface that may be in communication with the remote device independent of the vending machine.

The video communications device may be configured to support some or all of the features discussed in the figures above. For example, the video communications device may support the overlaying of a portion of a screen of a remote device of the ticket office on a portion of the display of the video communications device. The overlaid portion may update in real-time based on changes to the portion of the screen of the remote device, such as when dynamic data is displayed. The video communications device may also display screen touch indications based on interactions with the remote device. In some embodiments, the video communications device may enable an expert mode as described herein such that component of the vending machine and video communications device are controllable by the remote device. The video communications device may also include sensors that may detect an interaction with a user of the vending machine and the video communications device, match the interaction with a database of interactions, and adjust a parameter of a hardware peripheral of the vending machine and/or the video communications device in response to the matched interaction, such as described in FIGS. 14 and 15. In some embodiments, the video communications device may include an identifier associated with the vending machine such that information associated with the vending machine and the communications device is retrievable by the remote device.

Figure 18:
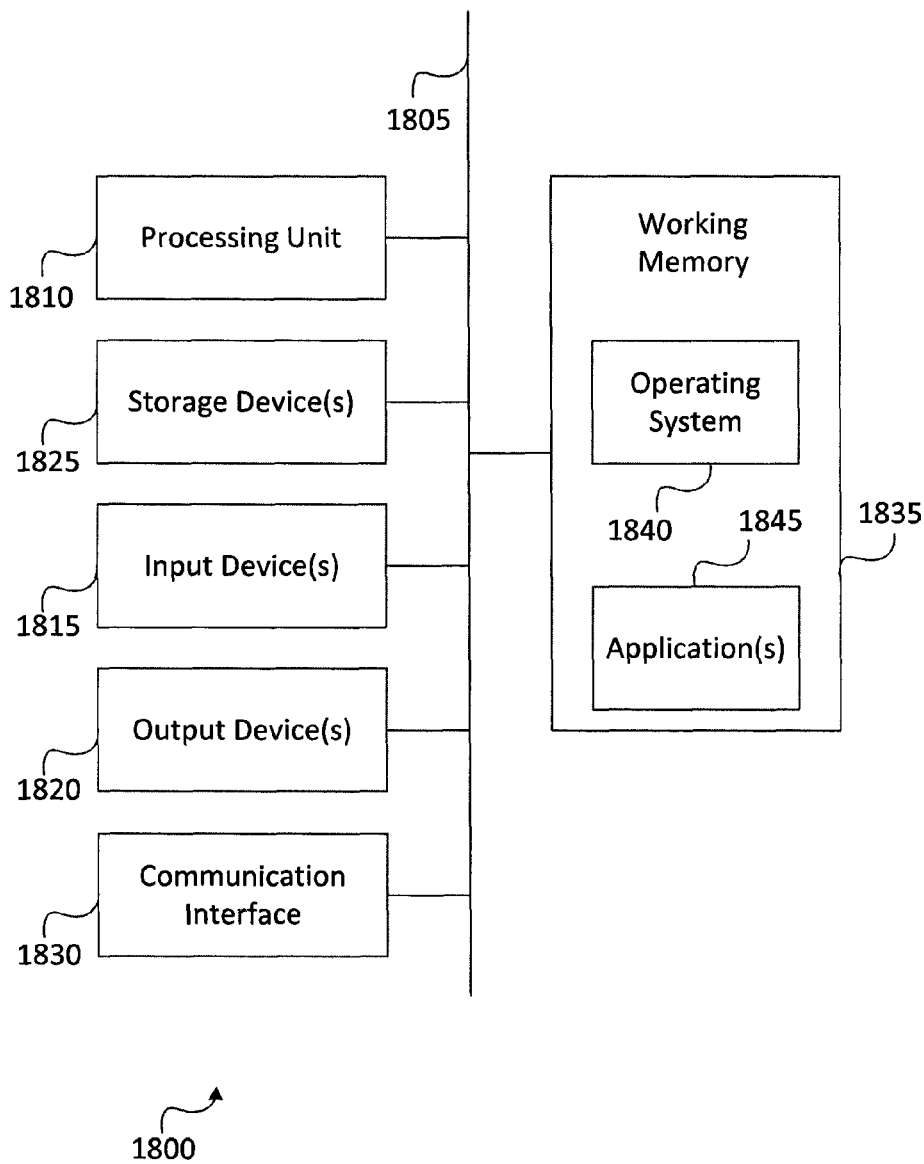
FIG. 18 is a block diagram of an example computing system according to embodiments.

A computer system as illustrated in FIG. 18 may be incorporated as part of the previously described computerized devices. For example, computer system 1800 can represent some of the components of the vending machine 100, transit server 202, vending machine 204, ticket office computer 206, remote device 1200, and/or video communications device 1600, as well as similar devices described herein. FIG. 18 provides a schematic illustration of one embodiment of a computer system 1800 that can perform the methods provided by various other embodiments, as described herein, and/or can function as the host computer system, a remote kiosk/terminal, a point-of-sale device, a mobile device, and/or a computer system. FIG. 18 is meant only to provide a generalized illustration of various components, any or all of which may be utilized as appropriate. FIG. 18, therefore, broadly illustrates how individual system elements may be implemented in a relatively separated or relatively more integrated manner.

The computer system 1800 is shown comprising hardware elements that can be electrically coupled via a bus 1805 (or may otherwise be in communication, as appropriate). The hardware elements may include a processing unit 1810, including without limitation one or more general-purpose processors and/or one or more special-purpose processors (such as digital signal processing chips, graphics acceleration processors, and/or the like); one or more input devices 1815, which can include without limitation a mouse, a keyboard, a touchscreen, receiver, a motion sensor, a camera, a smartcard reader, a contactless media reader, and/or the like; and one or more output devices 1820, which can include without limitation a display device, a speaker, a printer, a writing module, and/or the like.

The computer system 1800 may further include (and/or be in communication with) one or more non-transitory storage devices 1825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1800 might also include a communication interface 1830, which can include without limitation a modem, a network card (wireless or wired), an infrared communication device, a wireless communication device and/or chipset (such as a Bluetooth™ device, an 502.11 device, a WiFi device, a WiMax device, an NFC device, cellular communication facilities, etc.), and/or similar communication interfaces. The communication interface 1830 may permit data to be exchanged with a network (such as the network described below, to name one example), other computer systems, and/or any other devices described herein. In many embodiments, the computer system 1800 will further comprise a non-transitory working memory 1835, which can include a RAM or ROM device, as described above.

The computer system 1800 also can comprise software elements, shown as being currently located within the working memory 1835, including an operating system 1840, device drivers, executable libraries, and/or other code, such as one or more application programs 1845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1825 described above. In some cases, the storage medium might be incorporated within a computer system, such as computer system 1800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1800 and/or might take the form of source and/or installable code, which, upon compilation and/or installation on the computer system 1800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1810, applications 1845, etc.) Further, connection to other computing devices such as network input/output devices may be employed.

Some embodiments may employ a computer system (such as the computer system 1800) to perform methods in accordance with the disclosure. For example, some or all of the procedures of the described methods may be performed by the computer system 1800 in response to processing unit 1810 executing one or more sequences of one or more instructions (which might be incorporated into the operating system 1840 and/or other code, such as an application program 1845) contained in the working memory 1835. Such instructions may be read into the working memory 1835 from another computer-readable medium, such as one or more of the storage device(s) 1825. Merely by way of example, execution of the sequences of instructions contained in the working memory 1835 might cause the processing unit 1810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1800, various computer-readable media might be involved in providing instructions/code to processing unit 1810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1825. Volatile media include, without limitation, dynamic memory, such as the working memory 1835. Transmission media include, without limitation, coaxial cables, copper wire and fiber optics, including the wires that comprise the bus 1805, as well as the various components of the communication interface 1830 (and/or the media by which the communication interface 1830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1830 (and/or components thereof) generally will receive the signals, and the bus 1805 then might carry the signals (and/or the data, instructions, etc. carried by the signals) to the working memory 1835, from which the processor(s) 1805 retrieves and executes the instructions. The instructions received by the working memory 1835 may optionally be stored on a non-transitory storage device 1825 either before or after execution by the processing unit 1810.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method of automatically adjusting a parameter of a transit fare vending machine based on a response, the method comprising:
   receiving, at a transit fare vending machine, an input to initiate audio/visual communication with a remote device of a ticket office of a transit system, the input being provided by a user of the transit fare vending machine;
   establishing the audio/visual communication between the transit fare vending machine and the remote device of the ticket office;
   detecting, using sensors of the transit fare vending machine, a response from the user of the transit fare vending machine, the response comprising one or more of a body position or a body action of the user associated with a parameter of the transit fare vending machine being outside of a desired range;
   matching the response with at least one remedy of a database of remedies, each remedy comprising an adjustment to a parameter of the transit fare vending machine;
   adjusting a parameter of the transit fare vending machine related to the audio/visual communication based on the matched remedy such that the parameter may be tuned to the desired range;
   monitoring the response to the adjusted parameter to determine whether the adjustment successfully tuned the parameter to the desired range; receiving a request from the remote device to adjust the parameter; detecting a behavior of the user upon receiving the request; updating the database of remedies to include the behavior; and associating the behavior with a suggested remedy.

2. The method of automatically adjusting a parameter of a transit fare vending machine based on a response of claim 1, further comprising:
   adjusting the parameter a second time based on the monitored response determining that the adjustment was not successful in tuning the parameter to the desired range.

3. The method of automatically adjusting a parameter of a transit fare vending machine based on a response of claim 1, wherein:
the parameter comprises one or more of a font size, a display contrast, a display brightness, or a volume level.

4. The method of automatically adjusting a parameter of a transit fare vending machine based on a response of claim 1, wherein:
the sensors of the transit fare vending machine comprise one or more of a camera, an ultrasound device, light sensors, weight sensors, infrared sensors, or proximity sensors.

5. The method of automatically adjusting a parameter of a transit fare vending machine based on a response of claim 1, wherein:
detecting, using sensors of the transit fare vending machine, a response from the user of the transit fare vending machine comprises:
capturing an image of the user with a camera of the transit fare vending machine; and
using video analytics to identify the response.

6. The method of automatically adjusting a parameter of a transit fare vending machine based on a response of claim 1, further comprising:
receiving an input using an input device of the transit fare vending machine to set the adjusted parameter as a default value for the user, the input specifying whether to use the default value for only the transit fare vending machine or at all vending machines within the transit system.

7. A non-transitory computer-readable medium having instructions embedded thereon for automatically adjusting a parameter of a transit fare vending machine based on a response, the instructions comprising computer code for causing a computing device to:
receive, at a transit fare vending machine, an input to initiate audio/visual communication with a remote device of a ticket office of a transit system, the input being provided by a user of the transit fare vending machine;
establish the audio/visual communication between the transit fare vending machine and the remote device of the ticket office;
detect, using sensors of the transit fare vending machine, a response from the user of the transit fare vending machine, the response comprising one or more of a body position or a body action of the user associated with a parameter of the transit fare vending machine being outside of a desired range;
match the response with at least one remedy of a database of remedies, each remedy comprising an adjustment to a parameter of the transit fare vending machine;
adjust a parameter of the transit fare vending machine related to the audio/visual communication based on the matched remedy such that the parameter may be tuned to the desired range;
monitor the response to the adjusted parameter to determine whether the adjustment successfully tuned the parameter to the desired range; receive a request from the remote device to adjust the parameter; detect a behavior of the user upon receiving the request; update the database of remedies to include the behavior; and associate the behavior with a suggested remedy.

8. The non-transitory computer-readable medium of claim 7, further comprising instructions for causing the computing device to:
adjust the parameter a second time based on the monitored response determining that the adjustment was not successful in tuning the parameter to the desired range.

9. The non-transitory computer-readable medium of claim 7, wherein:
the parameter comprises one or more of a font size, a display contrast, a display brightness, or a volume level.

10. The non-transitory computer-readable medium of claim 7, wherein:
the sensors of the transit fare vending machine comprise one or more of a camera, an ultrasound device, light sensors, weight sensors, infrared sensors, or proximity sensors.

11. The non-transitory computer-readable medium of claim 7, wherein:
detecting, using sensors of the transit fare vending machine, a response from the user of the transit fare vending machine comprises:
capturing an image of the user with a camera of the transit fare vending machine; and
using video analytics to identify the response.

12. The non-transitory computer-readable medium of claim 7, further comprising instructions for causing the computing device to:
receive an input using an input device of the transit fare vending machine to set the adjusted parameter as a default value for the user, the input specifying whether to use the default value for only the transit fare vending machine or at all vending machines within the transit system.

13. A transit fare vending machine comprising:
a communications interface configured to send and receive data;
a sensor interface;
a memory; and
a processor configured to:
receive an input to initiate audio/visual communication with a remote device of a ticket office of a transit system, the input being provided by a user of the transit fare vending machine;
establish the audio/visual communication between the transit fare vending machine and the remote device of the ticket office;
detect, using the sensor interface, a response from the user of the transit fare vending machine, the response comprising one or more of a body position or a body action of the user associated with a parameter of the transit fare vending machine being outside of a desired range;
match the response with at least one remedy of a database of remedies, each remedy comprising an adjustment to a parameter of the transit fare vending machine;
adjust a parameter of the transit fare vending machine related to the audio/visual communication based on the matched remedy such that the parameter may be tuned to the desired range;
monitor the response to the adjusted parameter to determine whether the adjustment successfully tuned the parameter to the desired range; receive a request from the remote device to adjust the parameter; detect a behavior of the user upon receiving the request; update the database of remedies to include the behavior; and associate the behavior with a suggested remedy.

14. The transit fare vending machine of claim 13, wherein the processor is further configured to:

adjust the parameter a second time based on the monitored response determining that the adjustment was not successful in tuning the parameter to the desired range.

15. The transit fare vending machine of claim 13, wherein: the parameter comprises one or more of a font size, a display contrast, a display brightness, or a volume level.

16. The transit fare vending machine of claim 13, wherein: the sensor interface comprises one or more of a camera, an ultrasound device, light sensors, weight sensors, infrared sensors, or proximity sensors.

17. The transit fare vending machine of claim 13, wherein: detecting, using sensors of the transit fare vending machine, a response from the user of the transit fare vending machine comprises:

capturing an image of the user with a camera of the transit fare vending machine; and using video analytics to identify the response.

* * * * *